(12) United States Patent
Sarria

(10) Patent No.: US 9,109,582 B2
(45) Date of Patent: Aug. 18, 2015

(54) DEEP SEA THERMAL ENERGY MINING

(71) Applicant: Alberto Sarria, Bogota (CO)

(72) Inventor: Alberto Sarria, Bogota (CO)

( * ) Notice: Subject to any disclaimer, the term of this patent is extended or adjusted under 35 U.S.C. 154(b) by 113 days.

(21) Appl. No.: 13/661,141

(22) Filed: Oct. 26, 2012

(65) Prior Publication Data

US 2014/0116044 A1    May 1, 2014

(51) Int. Cl.
*F03G 7/05* (2006.01)

(52) U.S. Cl.
CPC .. *F03G 7/05* (2013.01); *Y02E 10/34* (2013.01)

(58) Field of Classification Search
USPC ............... 60/671.1–641.7, 398, 641.1–641.7;
203/DIG. 20; 165/45, 69, 96, 102, 110,
165/128, 129, 139, 159, 101, 196, 161
See application file for complete search history.

(56) References Cited

U.S. PATENT DOCUMENTS

| | | | |
|---|---|---|---|
| 4,776,169 A * | 10/1988 | Coles, Jr. | 60/641.2 |
| 5,513,494 A * | 5/1996 | Flynn et al. | 60/641.7 |
| 8,001,784 B2 * | 8/2011 | Marshall | 60/641.2 |
| 8,307,896 B2 * | 11/2012 | Sarria | 166/272.1 |
| 2011/0173979 A1 * | 7/2011 | Krull et al. | 60/641.7 |

FOREIGN PATENT DOCUMENTS

GB        2395754 A  *  6/2004  ............... F03G 7/05

* cited by examiner

*Primary Examiner* — Kenneth Bomberg
*Assistant Examiner* — Wesley Harris
(74) *Attorney, Agent, or Firm* — Neifeld IP Law, PC

(57) ABSTRACT

A method and apparatus for heating fluids with the earth's internal energy released through the vents of the ridge expansion zones in the planet's seas. The whole apparatus is composed of three main parts: components located on a large barge include the main pump, a water filtering system, a pressure regulating valve. The second part contains long concentric tubes of constant diameter handing from the barge and defining outer and inner fluid channels through which cool water flows down while heated water flows up. The third part is a heat exchanger attached at the bottom of the long concentric tubes, which is placed over a thermal vent in the ocean floor. Crust fracturing may be used to stimulate the vent's flow by injecting high pressure water through wells that may be vertical, inclined or directional.

24 Claims, 18 Drawing Sheets

1-1

2-2

DEEP SEA THERMAL ENERGY MINING

FIELD

Geothermal energy is used to heat water or other liquids in a heat exchanger located at the deep sea thermal vents of the ridge spreading zones to generate clean electric power and/or desalinize seawater.

BACKGROUND

Spreading ridges along some of the oceans cordilleras are zones of huge quantities of thermal energy released by means of deep see water circulation that penetrates fractures on the upper ocean crust. Hot magma is not very deep in these spreading zones. This thermal energy can be mined if an appropriate procedure is available. The thermal energy is produced by the infiltration of seawater through faults, fractures and porous zones in the upper oceanic crust to depths where the ascending magma has high temperatures. That water returns to the sea forming thermal vents with water temperatures up to 450° C. or more. Although there are also vents with low temperature.

The ascending water speed of the vent may vary from low values to values as one meter per second or more. This ascending water tends to be very acidic.

U.S. application Ser. No. 12/718,546, filed Mar. 5, 2010 (Alberto Sarria), discloses a method for using concentric tubes placed deep underground to heat water or other liquids by geothermal energy, and generating electric power and/or desalinized seawater.

U.S. Pat. No. 8,001,784 (Marshall) discloses a system that recovers superheated fluids from deep-ocean hydrothermal vents and allows those fluids to be utilized as a thermal energy source. The system is configured to direct a flow of superheated deep-ocean hydrothermal fluid to the surface for use in generating electricity or desalinating water.

A thermal vent may be considered a special kind of small volcano lying on the sea bottom. There are also full volcanoes on the sea bottom. Thermal vents form and persist for years but may be destroyed from time to time. The location of a thermal vent depends on the hot magma position, which means that they are not located all along the spreading ridges in the oceans, and also means that the formation of new vents or the improvement of those that are active may be stimulated by artificial procedures similar to those used in the EGS geothermal mining.

The thermal vents may be located at depths which vary from a few hundred to over three thousand meters. There are spreading ridges zones in the middle of the oceans and some are located more or less near the cost. That is the case in Juan de Fuca Ridge, near the coasts of Oregon and Washington states in the United States, in the Red Sea, near the coasts of Turkey and Italy and in some other parts of the world.

The chemical composition of the water flowing upward from the thermal vents is corrosive because as water penetrates through the fissures it dissolves some acid components of the rock. This corrosive characteristic combined with the high water temperature has to be taken into consideration in any procedure in the mining of the thermal energy of the vents hot water. Also, those special conditions are the origin of very particular species of fauna and flora.

The hydrocarbon industry has developed an important expertise in working at the sea bottom. Many studies by governmental agencies and special research programs have been done to locate and identify the thermal, hydraulic and temperature characteristics of the deep ocean. The fracturing of rocks by injecting high-pressure water is a common procedure widely used in continental areas as well as sea bottom hydrocarbon reservoirs.

Most of the thermal vents and promising spreading ridges are still to be located or evaluated from the point of view of chemical and physical characteristics of the water ascending from the vent. Also, the possibility to improve the thermal characteristics of some vents and the possibility to create new vents by artificial procedures like rock fracturing have yet to be studied.

SUMMARY OF THE INVENTION

One object of the invention is to provide a method for heating sea water which has been brought down from at or near the sea surface by means of the deep sea fluids produced by the thermal vents formed at the spreading ridge zones of the earth's oceans due to the internal energy of a more or less surficial hot magma. Said heated water taken to the sea surface may be used for clean base power generation; it also may be desalinated.

Another object of the invention is to provide a method for heating fluids using earth's internal energy released by thermal vents at sea floor ridge expansion zones, comprising:
  passing filtered and pressurized fluid produced on a barge into a concentric tube assembly having constant-diameter inner and outer tubes that form inner and outer fluid channels down to a heat exchanger suspended near the mouth of a thermal vent in the sea floor,
  passing the pressurized fluid through a transition section at the lower end of the constant diameter tube assembly having inner and outer fluid channels of larger diameter,
  passing the pressurized fluid through said transition section to a an outer fluid channel inside the heat exchanger,
  spilling the pressurized fluid into the heat exchanger through outlet windows in a lower part of said outer fluid channel inside the heat exchanger,
  passing the spilled fluid through spaces between vertical pipes in the heat exchanger, thereby heating the fluid by means of thermal energy transferred from said vertical pipes through which flow hot water released from the thermal vent,
  passing the heated fluid through inlet windows to an inner fluid channel inside the heat exchanger,
  ascending the heated fluid toward the sea surface through the inner fluid channel of the concentric tube assembly, where the heated fluid is used to generate power,
  controlling pressure of the ascending fluid by combined action of a pump and a valve located on the barge,
  preventing bending of the concentric tube assembly, and controlling amplitude of horizontal vibrations of the inner tube, with supports and separators attached to an external wall of the constant diameter inner tube, said inner tube being of double walled construction with a vacuum between said double walls.

Another object is to provide an apparatus for heating fluids using earth's internal energy released by thermal vents at sea floor ridge expansion zones, comprising:
  a filter and pump for passing filtered and pressurized fluid produced on a barge into a concentric tube assembly having constant-diameter inner and outer tubes that form inner and outer fluid channels down to a heat exchanger suspended near the mouth of a thermal vent in the sea floor,
  a transition section at the lower end of the constant diameter tube assembly having inner and outer fluid channels of larger diameter for passing the pressurized fluid to an outer fluid channel inside the heat exchanger, from which the pressurized fluid spills into the heat exchanger through outlet windows in a lower part of said outer fluid channel inside the heat exchanger, wherein the spilled fluid passes through spaces between vertical pipes in the heat exchanger, thereby heating the fluid by means of thermal energy transferred from said vertical pipes through which flow hot water released from the thermal vent, and the heated fluid passes through inlet windows to an inner fluid channel inside the heat exchanger, and the heated fluid ascends toward the sea surface through the inner fluid channel of the concentric tube assembly, where the heated fluid is used to generate power, pressure of the ascending fluid is controlled by combined action of a pump and a valve located on the barge, and bending of the concentric tube assembly is prevented, and amplitude of horizontal vibrations of the inner tube are controlled with supports and separators attached to an external wall of the constant diameter inner tube, said inner tube being of double walled construction with a vacuum between said double walls.

DETAILED DESCRIPTION OF THE INVENTION

Figure 1:
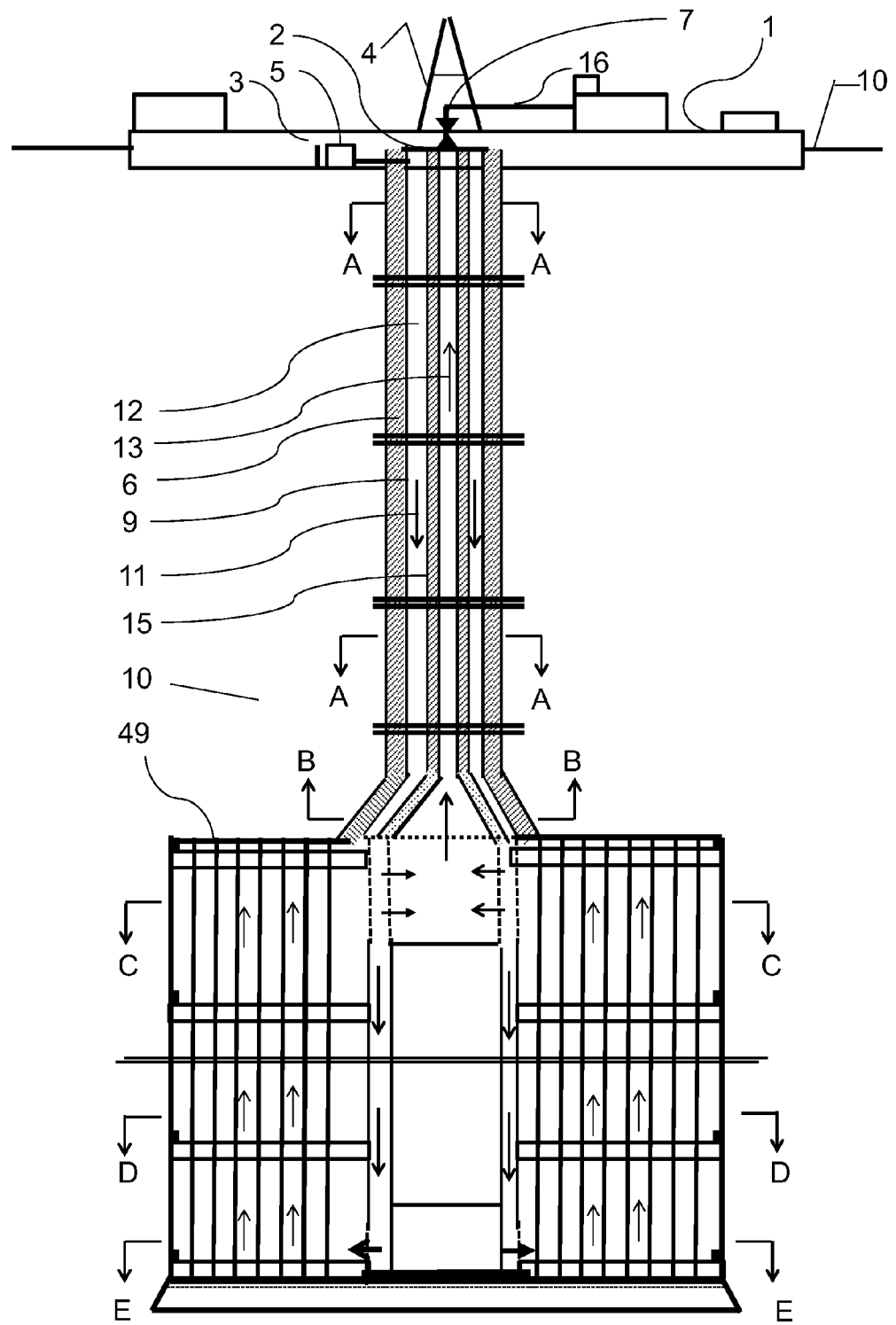
FIG. 1: Vertical view of the basic procedure scheme. Drawing is not to scale. This figure shows the essence of the invention, taking sea surface water and feeding it through the annular space formed by an outer tube and an inner tube that hang from a barge at the surface and going down very close to the vent position in the sea bottom. The tube diameters are constant up to a point close to the heat exchanger. A thick low density material covers the outer tube to give it flotation and to reduce its weight to facilitate construction. Inclined ties are shown to give a partial support to the large diameter long two tubes

The invention has three main groups of components: the first group is located in the sea surface on a large and special barge. The second group is composed of two long concentric tubes that feed sea water down from the surface to a heat exchanger located very close to the sea bottom. The third group corresponds to a large and specialized heat exchanger which is hung from the barge by means of the concentric tubes. The possibility to fracture the rock by using high pressure water depends on the local conditions.

Embodiments of the invention include a method and an apparatus for heating fluids using earth's internal energy released by thermal vents at ocean ridge expansion zones, comprising:

a filter for sea surface water that passes to a main pump located on a barge, a main pump that receives the filtered sea water and feeds it to a concentric tube assembly having constant diameter inner and outer tubes which form inner and outer fluid channels for descending fluid through the outer fluid channel to a heat exchanger near the thermal vent, and ascending heated fluid through the inner fluid channel, said main pump being located below the flotation line of the barge, a valve on the barge acts simultaneously with the main pump to keep the descending and ascending water always above atmospheric pressure, said concentric inner and outer tubes are built in segments and have a first constant diameter from the barge to a depth near the thermal vent's mouth, the outer tube may be constructed of protected steel or other suitable material resistant to corrosion. Externally, the outer tube is wrapped by a thick cover of a low unit weight material to reduce the tube's own weight due to the flotation action of the low mass density of the wrapping material. In the job site, parts of the outer tube are welded to obtain its necessary final length. The cover surface is protected against sea water action, the constant diameter inner tube has double-walls separated by reinforcing veins. Through this inner tube the heated water in the heat exchanger ascends to toward the surface. The space between the double walls forms a vacuum obtained during the tube's manufacture process that insulates the heated ascending water from the cold descending water; besides that the vacuum produces an important flotation force that helps to assemble tube parts on the job; during construction, parts of the inner tube are screwed to each other to obtain the necessary final length, separators located in planes at specified distance from each other to avoid the formation of undesirable medium to short period horizontal vibrations of the inner tube; whereby if the tubes bend, the separators keep them in their original relative positions augmenting stiffness as the separators touch the external tube, the pressure produced by the joint action of the main pump and the special valve at surface is enough to surpass the head losses giving the possibility of the water column to flow; besides, this extra pressure avoids the descending and ascending fluid to boil; whereby seawater salts are kept dissolved in the ascending and descending fluids to avoid clogging of the inner fluid channel, a heat exchanger formed by a stainless steel (or other suitable material) cylindrical tank with lower and upper caps and internal non corrosive, high resistance, high thermal conductivity aluminum alloy pipes that extend vertically along it height, said pipes are open at the lower and upper cap extremes and are located in concentric circles of various diameter around the heat exchanger; reinforcement beams and fluid channels formed by enlarged constant diameter tubes pass from top to bottom caps along the vertical axis, allowing the vent's hot fluids to pass through said vertical t;

the vent's hot water flows through the vertical pipes and transfers heat to the sea surface water between the vertical pipes. The vent's hot water does not mix with the sea surface water, stainless steel flaps form a kind of ring at the lower part of the heat exchanger to guide the upward flow of hot vent water; screens to avoid clogging of the vertical pipes is provided as part of the flaps, a transition section is provided to join the concentric tubes having said first diameter to larger diameter concentric tubes located inside the heat exchanger which is welded to the upper part of said larger diameter tubes, the larger diameter provide space for outlet and inlet windows which allow the descending sea water to pass into the heat exchanger, and the heated sea water to pass out of the heat exchanger into to said inner fluid channel and return to the surface, rectangular openings in the upper part of the larger diameter concentric tubes form windows to allow the heated sea water to pass to the inner large diameter tube, rectangular openings in the lower part of a larger diameter concentric tube form windows to allow the cool descending water to spill into the heat exchanger. This abrupt discharge stimulates the occurrence of a turbulent flow in the spilled water inside the heat exchanger, wall channel section reinforcing ring beams made of the same material as the cylinder wall to allow support of the heat exchanger. Those beams are welded to the inner part of the heat exchanger circular wall, radial beams to support the whole heat exchanger from the two concentric tubes that are hung from the sea surface barge. In the inner extreme, those beams are welded to the outer enlarged diameter tube and on its external extremes the beams receive the load transferred by the ring beams, non corrosive metal rings located on several horizontal planes supported by the vertical high resistance high thermal conductivity pipes to avoid undesirable mechanical behavior produced by the vent's water flow or by thermal stresses.

The descending water from sea surface arrives to the lower part of the heat exchanger and spreads to fill the heat exchanger volume not occupied by the vertical pipes.

as the descending water spills in the heat exchanger, it flows up receiving the heat of the vent's hot water that flows upward through the vertical pipes, which have an internal diameter of about one and a half inch (3.7 centimeters).

In the upper part of the heat exchanger the heated sea surface water passes into the inner part of the two tubes and ascends to the sea surface pushed by the pressure imposed by the combined action of the main pump and the said valve At surface, the heated water is taken to a turbo generator to produce power that is carried to the consumption center by means of high voltage DC submarine cables. A portion of the used water may be recirculated to be fed to the main pump.

Some of the heated water can be desalinized using a part of the generated power.

A thermal vent's hot water flow can be stimulated by means of high water pressure injected to augment the natural porosity and the number of natural fissures. This process could improve an existing vent's flow and thermal characteristics, and may also be used to produce new thermal vents.

The present invention requires a large barge whose position must be controlled by GPS. It is possible that the position also be maintained with the help of TV cameras located in the lower part of the heat exchanger. The signals are received at the surface by cable protected by a shielded pipe. The general procedure comprises:

Passing sea surface water to a component to clean it by means of a fine screen: the cleaned water is suctioned by the main pump that feeds it to the required pressure to the annular space between the two concentric tubes A hydrocarbon refrigerant (e.g.HFC-23, HFC-134a and HFC152a) can be use as the fluid to be heated instead of sea surface water, Outer tube wall thickness may be about 10-30 mm, preferably 20 millimeters.

Covering the outer tube with a thick layer of a low density material to assure a substantial reduction of the submerged weight of the tube; this reduction is produced by the flotation action of the low mass density thick cover.

Protecting the low density material surface from the seawater action with a cover.

Welding adequate length segments of the outer tube to allow its construction with a crane in the barge while the tube's segments are in vertical position.

The inner tube internal diameter is chosen to obtain an adequate fluid velocity.

The space between the double walls of the inner tube is about 3 centimeters with walls about 6 millimeters. Four veins are provided to increase the strength and stiffness of the inner tube Constructing the inner tube is preferably done by screwing segments together, whose length may vary from one job to the other.

The appropriate internal characteristics such as low surface roughness must be given to the inner tube to allow the high velocity ascending hot fluid to return to surface with the minimum hydraulic head losses.

To surpass hydraulic head losses and to avoid the water boiling, the pressure of the cool descending and hot ascending water must always be higher than the atmospheric pressure. The extent of over pressure depends on local conditions to be fixed for each proper situation.

The required pressure in the descending and ascending fluid pressure is maintained by means of the combined action of the main pump and a special valve located on the barge.

The sea water is separated from its salts when boiling; if this happens in any part the apparatus will become clogged. This is one of the main reasons to have the descending and ascending fluid columns always above the atmospheric pressure.

The heat exchanger is made of stainless steel or other appropriate material that accomplish all stress and deformation requirements for its weight to be supported from the two concentric exterior and interior tubes.

The heat exchanger functions in a different manner compared to most of those used in industry. In this case the thermal energy is transferred to the interior of the heat exchanger through the surface of many vertical pipes and through the whole surface of the heat exchanger itself.

When the heat exchanger is in position just above an adequate vent never touches the sea bed, avoiding any contact with the local fauna and flora.

In the heat exchanger the surface seawater spilled flows down-up and finds the inlet window located in its upper part. During this slow down-up flow, the water is heated by the thermal energy transferred by the vertical pipes and by the thermal energy that flows through the heat exchanger wall and the lower cap.

The inlet windows, open in the two concentric enlarged diameter outer and inner tubes, allow the water to return to the inner double wall tube that extends up to the barge. As said, besides the hydrostatic pressure this water is pressurized and flows up through the inner fluid channel to surface. There the heated water is fed to a turbo generator. The used water will be recirculated to be fed again by means of the main pump.

The ascending water heat loss is reduced by means of a vacuum in the space between the double walls of the inner tube.

In the heat exchanger the down-up flow of the spilled water velocity is very low, which means that the time exposure of a differential volume of water to the heat transfer is long enough to receive an important quantity of thermal energy. Depending on the temperature of the vent water the descending fluid can be heated to a high enough temperature to be useful for power generation As the ascending velocity of the vent's flow through the vertical pipes may be as an average similar to one half meter per second, the exposure time of the down-up flow in the heat exchanger becomes very important to obtain a good thermal energy transfer.

The large size of the heat exchanger requires special reinforcements to keep it hung from the barge by means of the long concentric outer and inner tubes. For this reason perimeter channel section beams welded to the wall cylinder are required as well as plates to avoid stress concentrations produced by the radial beams that transfer the load of the heat transfer weight to the external enlarged diameter tube.

To locally improve the vent's flow a perimeter flap is provided in the external lower part of the heat exchanger to guide the vent's upward flow.

Under normal operating conditions the heat exchanger's bottom never touches the sea floor or the vent's mouth. This means that it will not alter the local fauna or flora. Its position may be changed according to necessities because to change its position is just a matter of changing the position of the surface barge The water temperature of the vents useful to heat the surface seawater brought to the heat exchanger may vary but a reasonable maximum average temperature would be about 300° C. to 350° C. This means that the vent's maximum water temperature passing through the vertical pipes of the heat exchanger could be in the same range. As the water flows up in the vertical pipes it begins to cool.

At the wall of the heat exchanger the vent's water temperature may be lower because as the vent's water ascend it mixes with the cold water of the deep sea. This may impose the necessity to cover the upper part of the interior wall of the heat exchanger with some kind of thermal insulation.

To improve the vent's flow a fracturing of the rock can be done by means of high pressure seawater injections to oceanic crust, continuous injection of this type may be required.

The injection of high pressure water to the upper part of the sea crust may activate geologic existing faults and new ones or new fractures may be formed as well as many fractures that would augment what could be called a local porosity. This would allow the deep circulation of more sea water to improve the existing vents or may stimulate the formation of new ones.

There is no kind of seismic activity concern about this enhancement procedure because those zones are located far away from populated areas and because small earthquakes are very frequent events in the deep sea ridge expansion zones where the vents are located.

Enhancement may be not necessary in some situations but it could be worthwhile in zones appearing to be promising. The rock fracturing process is essentially the same procedure as used to facilitate the extraction of natural gas in the continental regions and in EGS procedures for geothermic, enabling much more thermal energy to be mined by means of the apparatus of this invention.

Once the heated water in the heat exchanger returns to surface it must pass by a turbo generator, which requires all of the conventional appendages thereof except the heating component. The power generated may be carried to consumption areas by means of DC high voltage submarine cables.

The barge may also be used to install sun renewable energy procedures; which energy can be used for necessities of the whole procedure.

there could be a cluster of several whole apparatus to mine the thermal energy in a vent's rich area or in an enhanced zone. In this case one turbo generator could receive the thermal energy provided by several separate vents and the initial investment could be reduced.

Description of the Major Components Shown in FIGS. 1 to 17

As has been explained a large barge is required for this invention to function. No details are presented on the barge or the many components of the power generation which are apparent to those skilled in the art.

The main components of the invention are numbered 1 to 130.

1 Large special barge to navigate in open sea, whose local movement is controlled by GPS, with the load capacity to give room to a crane, a tubes yard, a turbo generator with all its appendages, the capacity to carry the apparatus claimed in the patent application and with the possibility to weld the parts of the outer tubes once they are put on vertical positions and to screw the parts of the inner tube once in vertical position. Element 1 is shown in FIG. 1.

2 Upper cap for the concentric tubes, 9 and 15, with such physical and geometrical characteristics as to allow the pressurized flow injection to outer flow channel 12 formed by the annular area between the tubes. The upper cap is a part of the main supporting structure that transfers the whole weight to the barge. Element 2 is shown in FIG. 1.

3 A fine screen to remove debris that may interfere with main pump 5 operation. Element 3 is shown in FIG. 1.

5 Main pump with spare power plant to feed the descending water 11 through the outer channel 12 formed by the concentric tubes. A pipe connection carries the water from the pump to the outer channel. The capacity of the spare power plant and the one of the main pump depend on the flow magnitude of the descending water 11 and on the depth to the heat exchanger 49 located very close to the sea floor 106. The combined action of the main pump 5 and the special valve 7 keep the cold descending 11 and ascending 13 fluids in its liquid phase. Element 5 is shown in FIG. 1.

Figure 3:
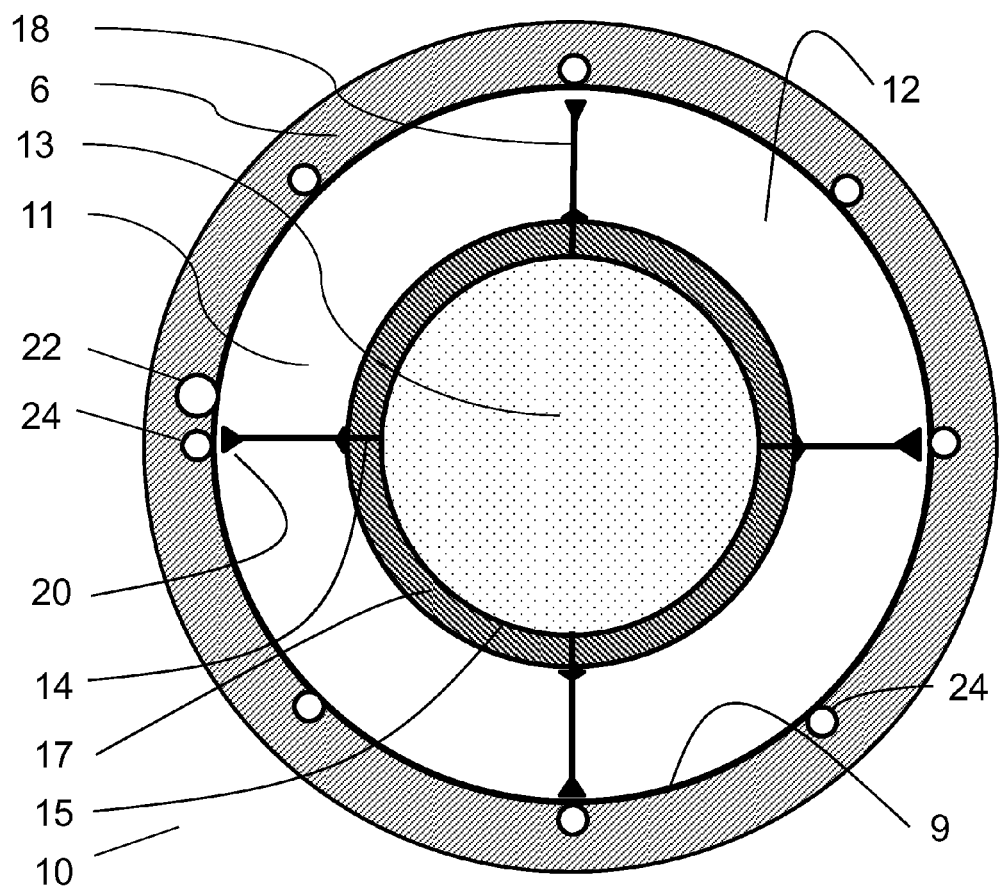
FIG. 3: Cross section A-A shown in FIG. 1. Drawing is not to scale. This figure shows the outer and inner tube and the separators to restrict the amplitude of the inner tube vibrations. A thick layer of low mass density wraps the outer tube to give it flotation, reducing its own weight when submerged to facilitate the construction. The figure also shows the inner tube's two walls; the space between the walls forms a vacuum providing both thermal insulation and flotation force to facilitate the assemblage of this tube on the job site. Small pipes for high pressure water to clean the bottom of the heat exchanger are shown. Another pipe shown is used for a power line for the small electric motors in the heat exchanger and for signal cables for TV cameras and other instruments located at the heat exchanger

6 Low mass density thick wrap of the outer tube, to produce a flotation to facilitate the construction of the welded long outer tube 19 and to reduce the load on the barge 1. Wrap's surface is covered with a long life protection material. The wrap thickness is the appropriate to give almost a full flotation to the submerged outer tube. Element 6 is shown in FIGS. 1 and 3.

7 Special valve that combined with the main pump 5 controls the heated fluid pressure once it arrives to surface and allows the heated flow pass to the power plant. The combined action of the valve 7 with the main pump 5 always keep the descending and ascending fluid in its liquid phase to avoid the salt separation from the sea water. Element 7 is shown in FIG. 1.

9 Protected for corrosion outer stainless steel tube; it can be made using other adequate material. The outer tube is hung from the barge 1 and its length is the necessary to maintain the heat exchanger 49 lower cap 53 very close to the vent's mouth 125. It prolongs from sea surface down to the heat exchanger 49 located just above the vent's mouth 104. Both the outer and inner tubes transfer to the barge 1 the load produced by the whole apparatus. The outer tube is wrapped by means of a low mass density 6 cover to produce a flotation that facilitates its assemblage during construction and its lowering into the sea. Element 9 is shown in FIG. 1.

10 Sea surface or medium depth sea. Element 10 is shown in FIGS. 1 to 7.

Figure 4:
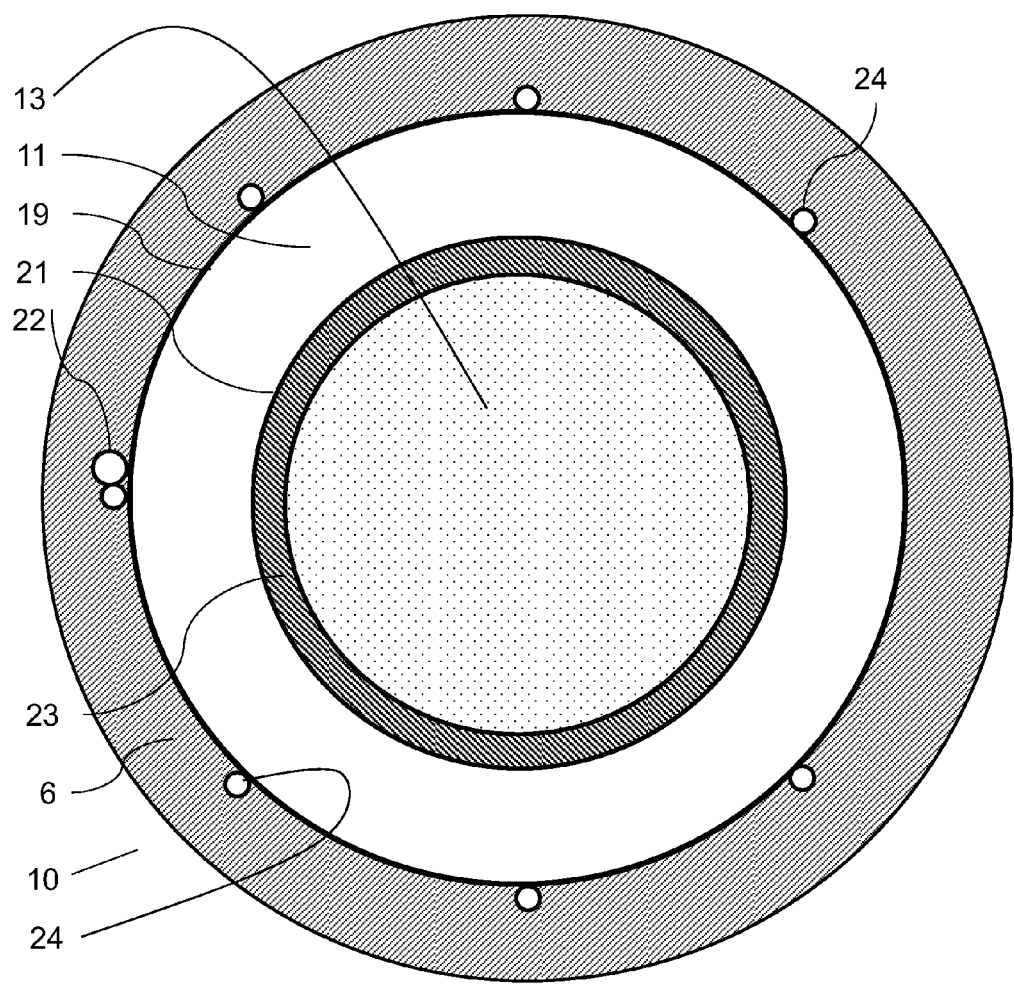
FIG. 4: Cross section B-B shown in FIG. 1. Drawing is not to scale. This figure shows the necessary diameter enlargement of the outer and inner tubes to connect them to axial tubes inside the heat exchanger. This is a short transition between the long concentric tubes coming from sea surface to the heat exchanger and the larger diameter of the heat exchanger axial tubes. The larger diameter tubes inside the heat exchanger are required to give room to the lower and upper outlet and inlets, respectively, for the sea surface water to spill through the outlet and then to flow upward inside the heat exchanger to pass into the inner tube and ascend toward the surface.
Figure 5:
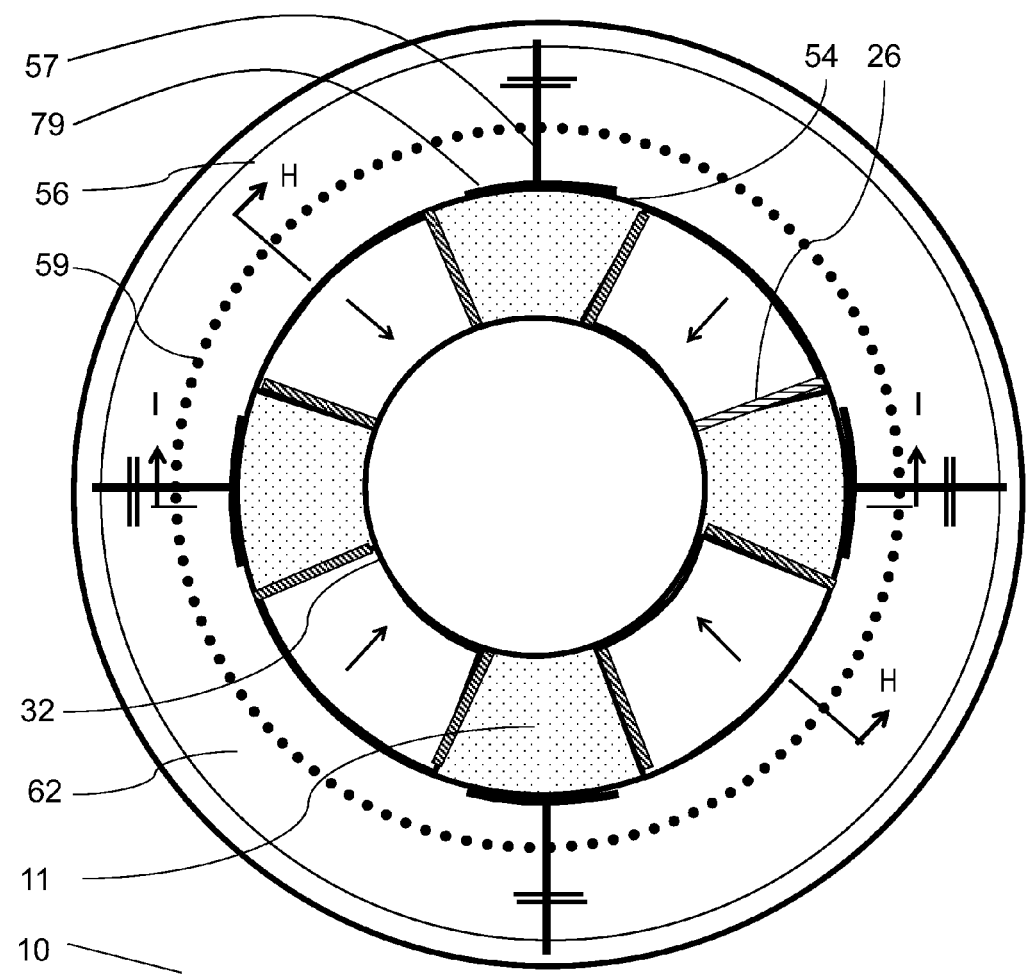
FIG. 5: Cross section 2-2 shown in FIG 2A. Drawing is not to scale. This figure shows a plan view of the inlet window for the circulation of the water that has been heated in the heat exchanger. The window is located in the upper part of the enlarged diameter concentric outer and inner tubes. There are four windows whose dimensions depend on the descending water flow. Through the rest of the tube's cross sectional area not occupied by the windows the descending water continues its way down to the bottom of the heat exchanger; this reduced area is shown dotted in the figure. The radial beams to partially support the weight of the heat exchanger are welded to the outer tube wall. Only a circle of vertical pipes is shown. Perimeter small diameter pipes are also shown.

11 Descending cool water fed by the main pump 5. The descending water goes down directly to the heat exchanger through the outer channel 12. The descending water temperature when arriving to the heat exchanger may be as low as 2° C. Element 11 is shown in FIGS. 1, 4 and 5.

12 Outer fluid channel formed by the annular area between the concentric outer and inner tubes, through which the water fed by the main pump 5 goes down directly to the heat exchanger 49 located several hundred meters below. Element 12 is shown in FIG. 3.

13 Ascending heated water. This is the same water that descended through the outer channel 12 and is heated in the heat exchanger 49. This water feeds the turbo generator where it is taken by means of the tube 16. At the surface, the ascending water may be as high as 160° C. or even more. Heated water is recirculated to return to the main pump. Element 13 is shown in FIGS. 3, 4 and 5.

14 Reinforcing veins of the inner tube 15. The four veins are to increase the strength and stiffness of the inner tube. The veins produce a mechanical combined action of the two walls of the inner pipe. Veins thickness may be about five millimeters. Element 14 is shown in FIG. 3.

15 Inner double wall tube through which ascends the heated water 13 from the heat exchanger 49 up to the surface passing by the special valve 7 and from there is carried by an insulated tube to the turbo generator. Wall thickness of this tube may be about nine millimeters. This pipe is made of a non corrosive steel or other appropriate material. The about 3 centimeter thick space 17 between the two walls is a vacuum space to insulate the heated ascending from the cooler descending flow. As the vacuum space is surrounded by water it gives an important flotation to the inner tube, reducing the crane capacity. Under that condition the heat loss from the ascending hot water to the descending cool water 11 is reduced to a minimum. The double wall tube may be manufactured in segments of about twenty meters length with screwed extremes. Once those segments are put in a vertical position in the barge by means of the crane, they are put together by a common type of screw joint. The inner tube starts at the barge 1 and ends in the bottom of the heat exchanger 49 where a diameter enlargement is required. Element 15 is shown in FIG. 3.

16 External tube that receives the heated water 13 in the special valve 7 and takes it to the turbo generator. The turbo generator is not a part of this description. Element 16 is shown in FIG. 1.

17 Vacuum insulation space between the two walls of the inner tube 15 that may be about 3 centimeters thick. It is expected that the vacuum be produced during the manufacture of the inner tube. This vacuum volume produces an important flotation force that reduces the tube's weight during the job site construction. As both extremes of each segment of the inner tube 15 are screwed, this implies that the vacuum is not continuous all along the whole inner pipe length. Element 17 is shown in FIG. 3.

18 Separators welded to the external wall of the inner tube. There are four separators located in planes spaced about four meters in each segment on the inner tube. There are about five separators plane in each inner tube segment. In each plane the separators are switch by an specified angle to avoid the formation of clearly defined natural modes of horizontal vibrations. Also, the aim of the separators is to avoid that outer 9 and inner 15 tubes may touch when bending if there are strong sea currents. Element 18 is shown in FIG. 3.

Figure 2A:
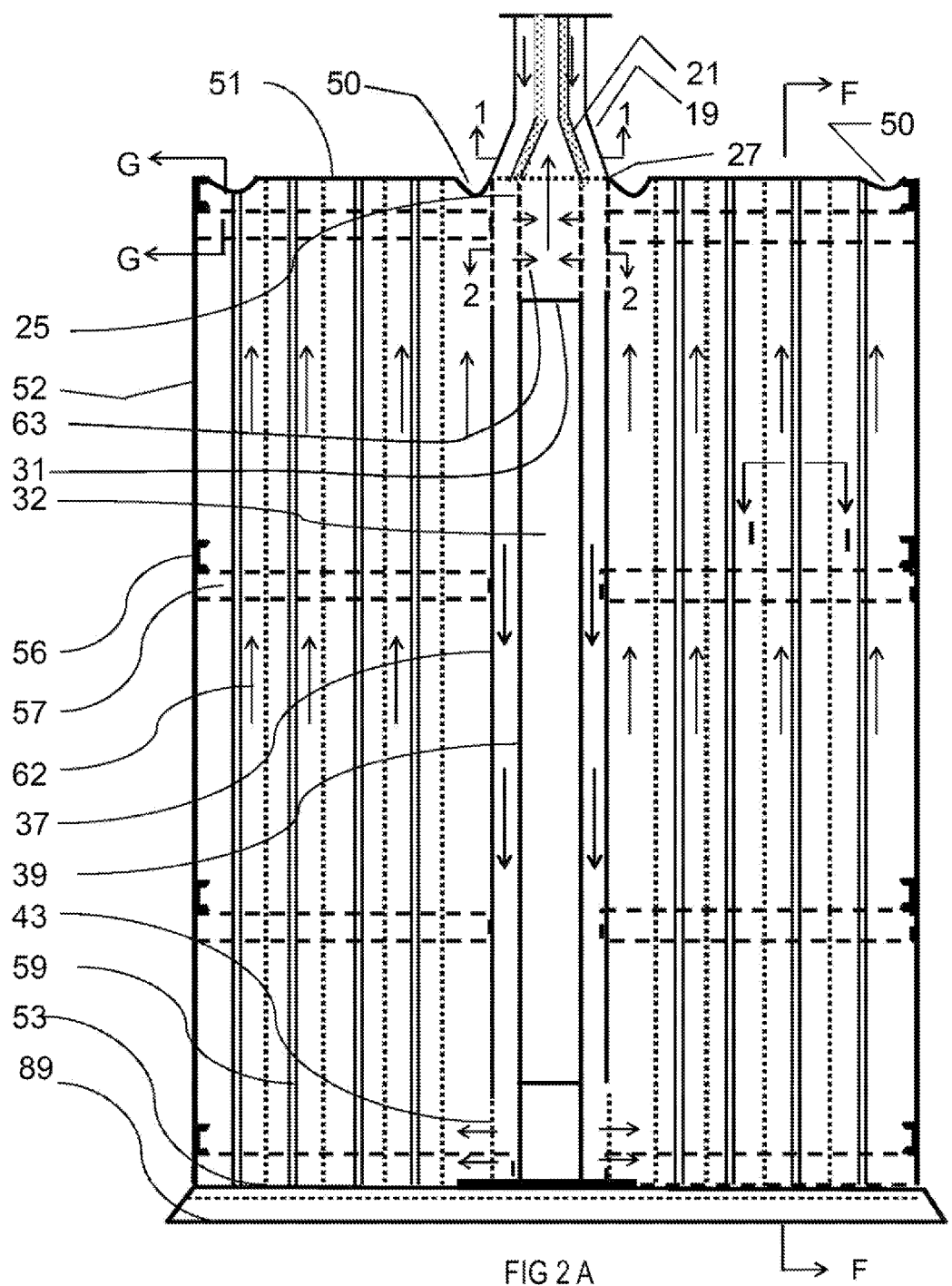
FIG. 2A: Vertical view of the heat exchanger located just above the vent's mouth. Drawing is not to scale. In the figure are shown the main components of the heat exchanger. The diameters of the outer and inner tubes are enlarged and welded to the upper cap. The enlarged diameter tubes are prolonged inside the heat exchanger down to its bottom and welded to it. The figure shows a large cylinder with upper and lower caps welded to its wall. There are many more or less small diameter vertical pipes through which flow the hot vent's water; those pipes are arranged in concentric circular positions and must be made by a high resistance, low corrosion and high thermal conductivity alloy. There are reinforcing and supporting beams.
Figure 2:
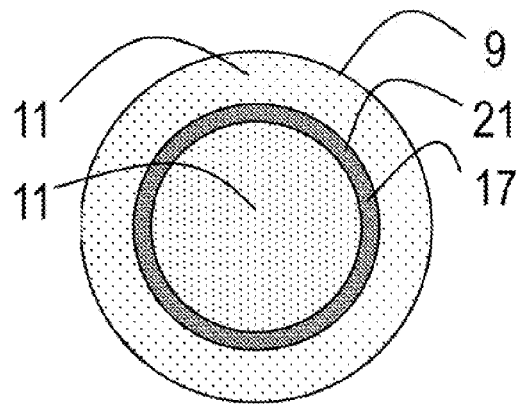
FIG. 2B: Cross section 1-1 shown in FIG 2A.
FIG. 2C: Cross section 2-2 shown in FIG 2A.
Figure 2:
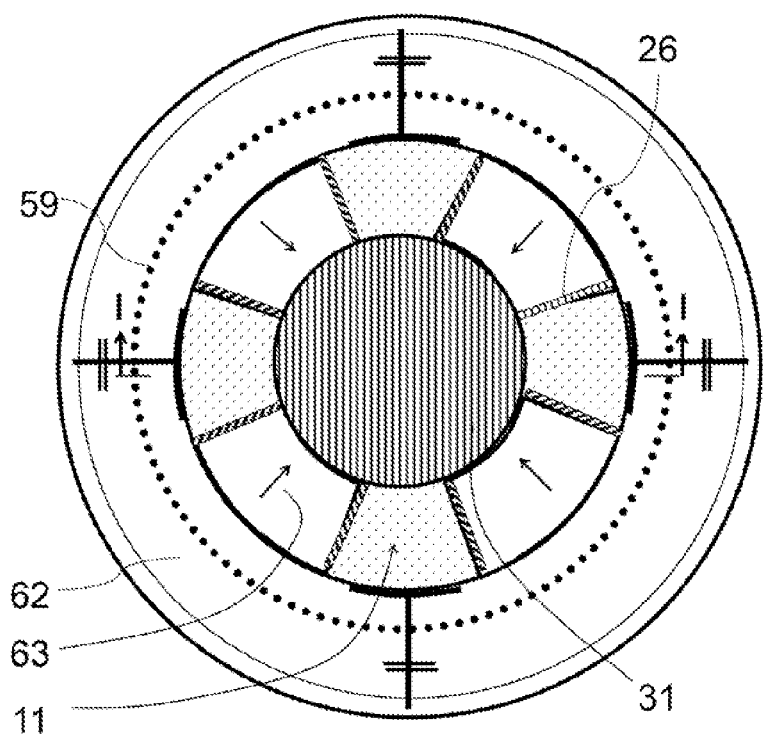
Figure 10:
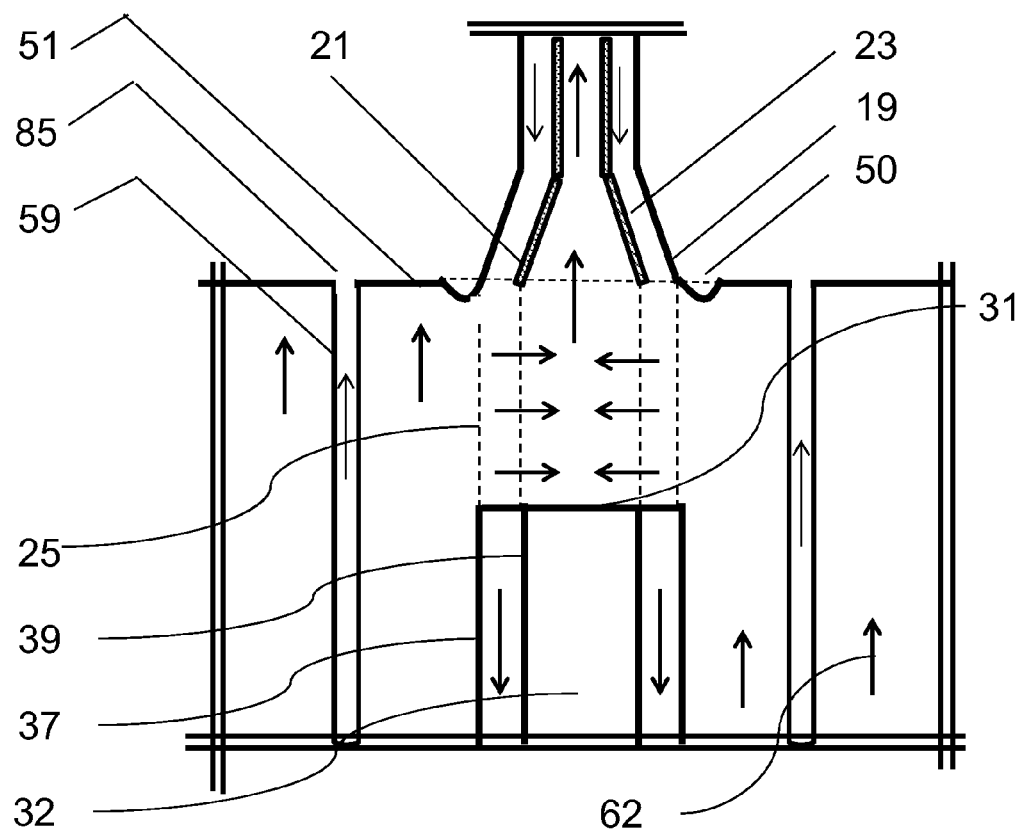
FIG. 10: Cross section H-H shown in FIG. 5. Drawing is not to scale. This figure shows the inlet window located at the upper part of the enlarged diameter tubes. There are four inlet windows that allow the heated water in the heat exchanger to pass into the enlarged diameter inner tube to continue up to sea surface level. The downward arrows in the figure indicate the descending water passing through the uninterrupted annular area between the enlarged diameter external and internal tubes.

19 Enlarged diameter transition of the outer tube before joining to the heat exchanger 49. This transition is required to fit with the outer and inner one wall concentric tubes inside the heat exchanger; this tube give room to the outlet and inlet windows inside the heat exchanger. Element 19 is shown in FIGS. 2A and 10.

20 Special tips welded to the separators free extremes. The aim of those tips is to avoid stress concentrations in the case the tip touches the internal face of the outer tube. Element 20 is shown in FIG. 3.

21 Enlarged diameter transition of the inner tube before joining to the heat exchanger 49. As for the outer tube, this diameter enlargement is required to give room to the outlet and inlet windows on the tube's segment inside the heat exchanger. There is also vacuum insulation 23 in the inner tube of the transition. Inside the heat exchanger 49 both tubes have the diameter corresponding to the maximum value of the enlargement. Element 21 is shown in FIGS. 4 and 10.

Figure 6:
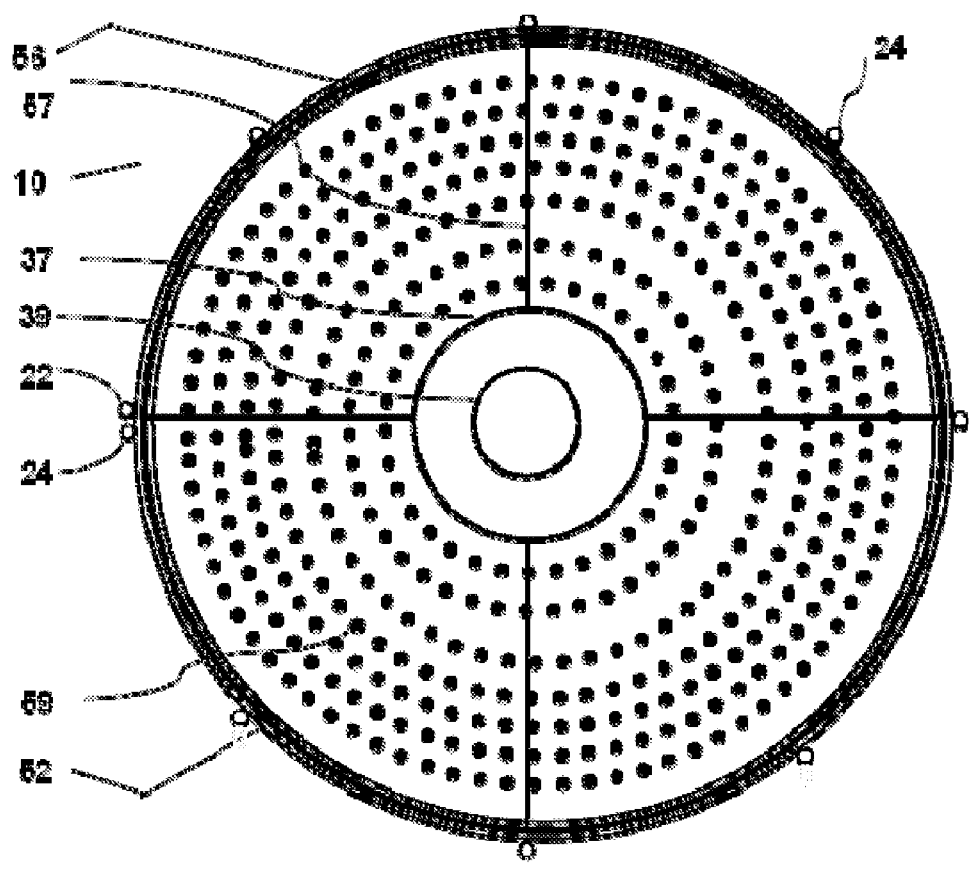
FIG. 6: Cross section D-D shown in FIG. 1. Drawing is not to scale. This figure is a sketch of the low corrosion high resistance, high thermal conductivity vertical pipes through which flows the hot water of the thermal vent. Vertical pipes are located in concentric circles and their number depends of the flow magnitude of the descending water to be heated. The circular and radial beams are shown and also the outer and inner concentric enlarged diameter tubes. As shown in this figure, the enlarged diameter inner tube can have one wall. Two walls for this tube are not required inside the heat exchanger. Perimeter small diameter pipes are also shown

22 Pipe for electrical signals welded to the outer tube 9. Inside this steel protected for corrosion tube are all the cables needed to transmit the signals of TV cameras with its powerful lights, the power for the small motors the heat exchanger requires to control its local position, and the instruments to measure temperatures and other physical and chemical properties of the vent's water. The pipe 22 goes down to the heat exchanger. There it must be kept at least twenty five centimeters above the upper cap to avoid any interference with the hot water flow of pipes 59. Element 22 is shown in FIGS. 3, 4 and 6.

23 Insulating vacuum space between the two walls of the enlarged diameter of the inner tube. This short part of the inner tube requires insulation to avoid heat loss to the descending water. Element 23 is shown in FIG. 10.

24 Eight heavy duty non corrosion pipes to inject high pressure water mixed with special products to clean the heat exchanger bottom. The high pressure high velocity jets are directed to the external part of the bottom cap 53 of the heat exchanger. The aim of the injected fluid is to clean debris and to avoid the scaling of the pipes 59 and bottom cap 53. Pipes 24 are welded to the outer pipe 9 and to the wall 52 of the heat exchanger 49. Cleaning depends on the observations of the TV cameras with its powerful lights located at the bottom of the heat exchanger that are transmitted to surface operators. Pipes 24 have a diameter of about seven and a half centimeters, are at least twenty five centimeters above the upper cap and then are welded to the walls 52 o the heat exchanger. Element 24 is shown in FIGS. 3, 4 and 6.

25 Inlet window to pass the fluid heated in the heat exchanger 49 to the inner tube enlarged diameter transition 21. The fluid heated by the heat exchanger pass into the inner tube transition and goes up to surface because it is pressurized by the combined action of the main pump 5 and the special valve 7. The whole perimeter of the inlet window space between the outer and inner tubes is covered by a welded plate 26. In that way, the inlet window allows the fluid passing with no possibility to return to the outer channel inside the heat exchanger. Element 25 is shown in FIG. 10.

26 Welded plate to seal the gap between outer 37 and inner 39 tubes in the inlet windows. Element 26 is shown in FIG. 5.

27 Weld of the outer and inner enlarged diameter transition 19 and 21, respectively, to the upper part of pipe 37 of the heat exchanger. Element 27 is shown in FIG. 2A.

Figure 11:
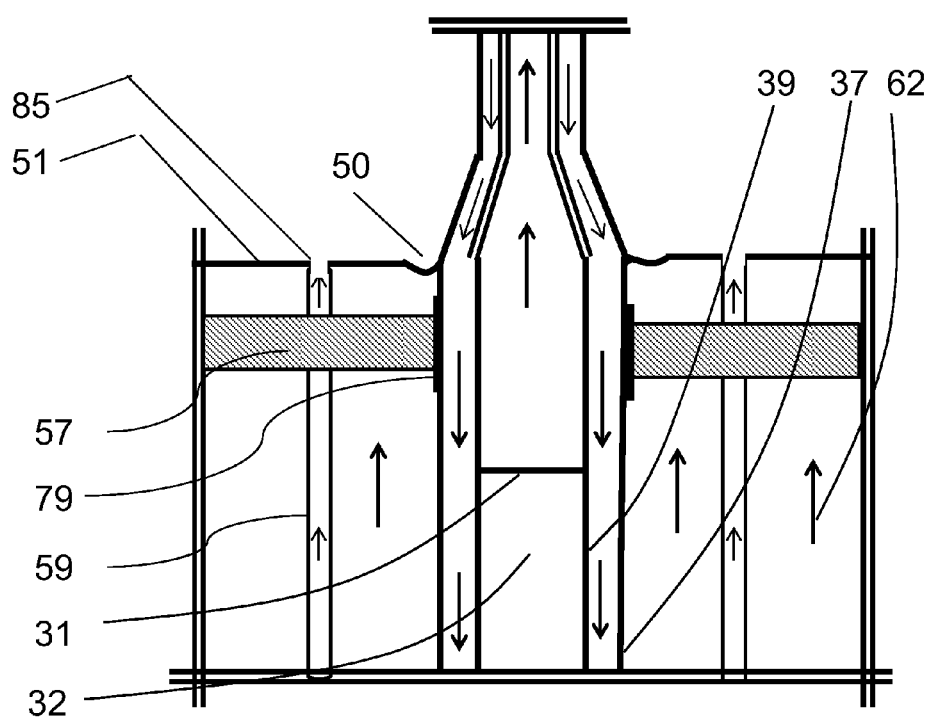
FIG. 11: Cross section I-I shown in FIG. 5. Drawing is not to scale. This figure shows the uninterrupted area at the upper part of the enlarged diameter tubes inside the heat exchanger, in the inlet zone. The descending water passes through this area to continue to the bottom of the two tubes annular area where it finds the lower inlet windows to spill into the heat exchanger.
Figure 12:
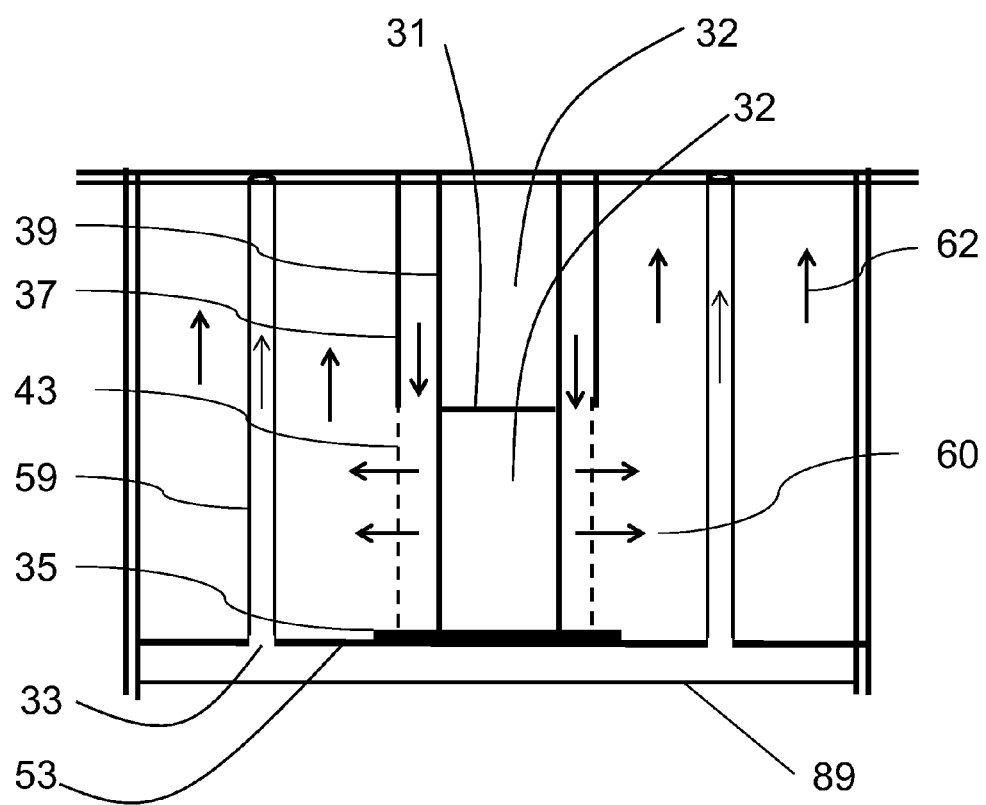
FIG. 12: Cross section J-J shown in FIG. 7. Drawing is not to scale. This figure shows the outlet located in the lower part of the enlarged diameter tubes inside the heat exchanger. The interruption of parts of the external tube's wall allows the formation of four lower rectangular windows through which the descending water spills into the heat exchanger. The inner tube is not interrupted; in this way the spilled water velocity is larger stimulating some turbulence in the lower part of the heat exchanger fluid. The spilled water fills the free space of the heat exchanger not occupied by the vertical pipes, and flows upward to the inlet window

31 Stainless steel or other suitable material cap to close a portion of the outer 37 and the inner 39 tubes in the heat exchanger portion of those tubes. Element 31 is shown in FIGS. 10, 11 and 12.

32 Empty portion of tube 39. Element 32 is shown in FIGS. 10, 11 and 12.

33 Open lower extreme of the vertical pipes 59 to allow the vent's hot water to ascend through the pipe. Element 33 is shown in FIG. 12.

Figure 13:
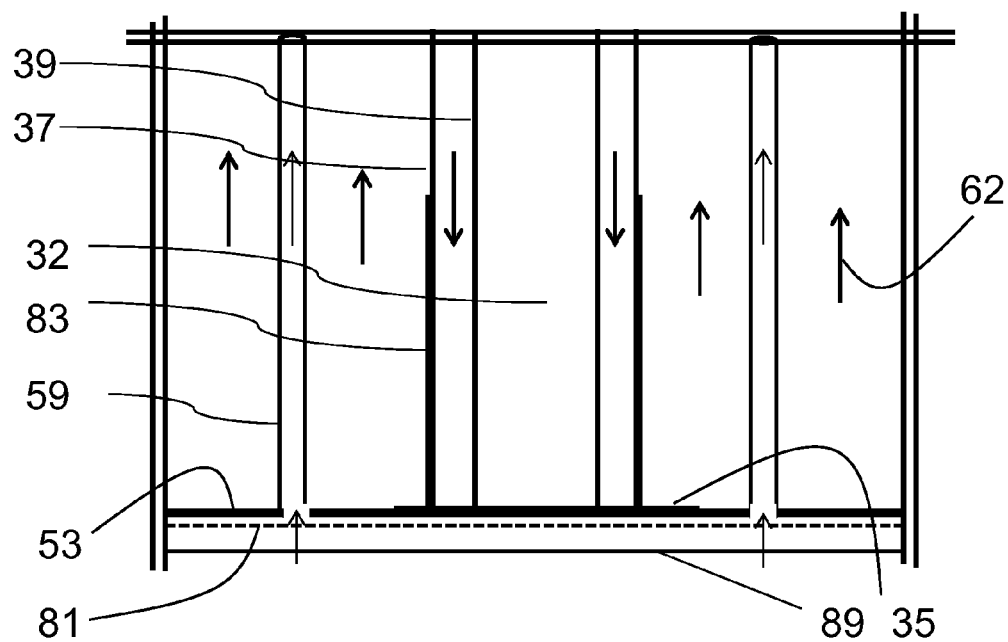
FIG. 13: Cross section K-K shown in FIG. 7. Drawing is not to scale. This figure shows the continuous part of the external tube at the outlet; those uninterrupted parts of the tube's wall also carry descending water which at the bottom has to flow horizontally to find the outlet lower window. The lower extreme of the inner and outer enlarged diameter tubes are welded to the lower cap of the heat exchanger.
Figure 14:
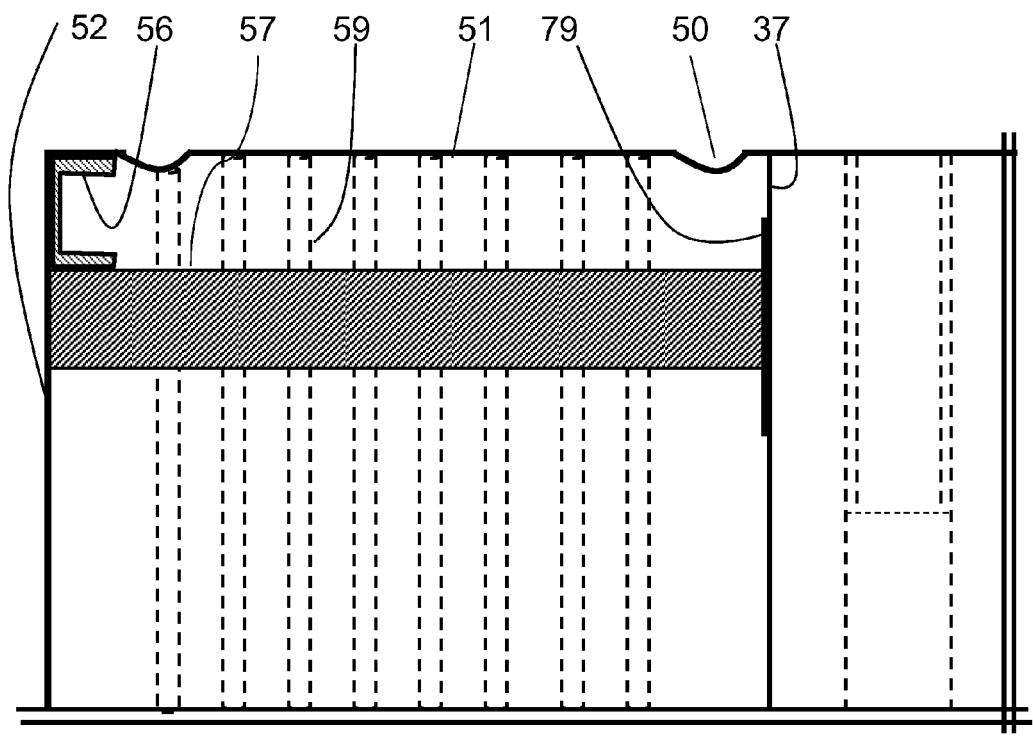
FIG. 14: Cross section L-L shown in FIG. 9. Drawing is not to scale. This figure shows both the ring channel beam and the radial supporting beam welded to the exterior wall of the outer enlarged diameter tube. A plate is welded to the tube to improve the mechanical characteristics of the radial beam support. In its free extreme, the radial beam receives a proportional load corresponding to a portion of the heat exchanger weight.
Figure 15:
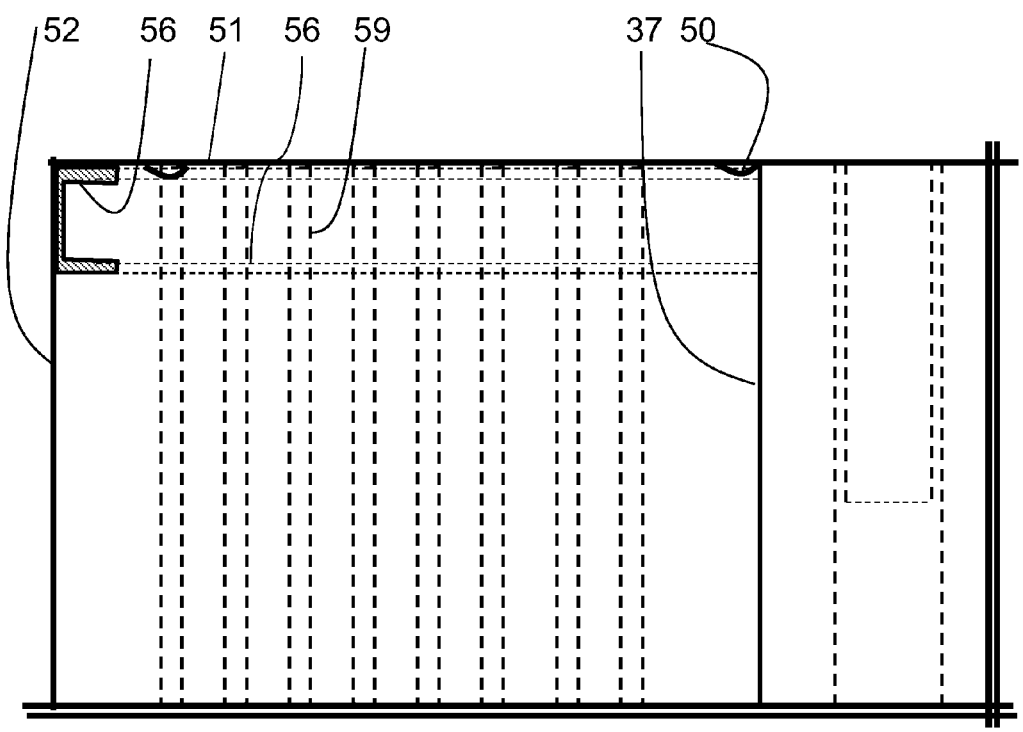
FIG. 15: Cross section M-M shown in FIG. 9. Drawing is not to scale. The figure shows the channel section beam. The perimeter channel section beam is welded to the internal wall of the heat exchanger to reinforce it for radial stresses and to allow the radial beams to take a portion of the heat exchanger weight. The number of perimeter channel beams and radial beams depend on the general dimensions of the heat exchanger.

35 Reinforcing stainless steel plate welded to the lower cap 53 of the heat exchanger 49. Element 35 is shown in FIG. 13.

37 External wall of the outer tube enlarged diameter. The diameter depends on the descending water flow. This diameter fits to the transition outer diameter. For a flow of one cubic meter per second the diameter may be about one and a half meter. Element 37 is shown in FIGS. 10 and 12.

39 Internal wall of the enlarged diameter transition of the outer tube inside the heat exchanger. The diameter depends on the descending water flow. For a flow of one cubic meter per second the diameter may be about one meter and twenty centimeters. Element 39 is shown in FIGS. 2A, 6, 10, 11 and 12.

43 Lower outlet windows through which the cool water arriving from sea surface spills into the heat exchanger 49. There are four outlet windows. The spilled water ascends slowly through the free space between the vertical tubes 59. Element 43 is shown in FIGS. 2A and 12.

49 Heat exchanger formed by a cylinder with its vertical wall 52 and upper 51 and lower cap 53. Stainless steel or other suitable material may be used to construct it. Inside the heat exchanger there are many vertical high strength, low thermal conductivity and low corrosion pipes 59, made of special alloy, to allow the upward vent's hot water flow. The upper cap has two circular wide wrinkles to handle vertical deformations induced by the thermal stresses, mainly produced by the 59 pipes. Along the vertical axis of the heat exchanger are the enlarged diameter inner and outer tubes 39 and 37. The surface sea water 11 arrives through the annular area between the tubes and spills into the heat exchanger through the four windows of the lower outlet 43. The spilled water flows up into the heat exchanger through the free space between the many vertical pipes 59. Once the spilled water flows upward very slow, it begins to be heated by the thermal energy of the hot walls of the vertical pipes. After some time, the heated spilled water arrives to the upper part of the heat exchanger and passes through the inlet 25 to the enlarged diameter transition of the outer and inner pipes and ascends to surface through the inner double wall tube 15. The heat exchanger works in a different way as happen in most similar industrial apparatus because the thermal energy flows into the heat exchanger by many points corresponding to the vertical pipes 59 and partially through its wall. There are several reinforcements in the heat exchanger. Horizontal circular channel beams 56, combined with radial beams 57 and the inner and outer tubes welded to the lower cap 53, and upper cap 51 and the transition allow the transference of the heat exchanger weight load to the large barge floating on the sea surface. The heat exchanger has a lower flap 89 to allow the vent's flow to converge to the vertical pipes 59. The horizontal and vertical positions of the heat exchanger may be changed at will by moving the barge or pulling the outer and inner pipes. The heat exchanger has an electrical connection for TV cameras and other instruments, not shown, to control the vent's water temperature and its physicochemical characteristics as well as the temperature of the sea water surrounding the apparatus. Once the construction materials are defined, the dimensions of the heat exchanger depend on the vent's hot water temperature and its flow magnitude, on the flow magnitude of the spilled sea surface water to be heated and partially on the blending of the hot vent's flow and the cool deep sea water around the apparatus. Element 49 is shown in FIG. 1.

50 Wide preformed wrinkle in the upper cap 51 of the heat exchanger. There are two circular preformed wrinkles in the upper cap. One wrinkle forms a lesser diameter circle around the external wall of the enlarged diameter tube 37; the other, with larger diameter, forms a circle near the wall of the heat exchanger. The aim of those wrinkles is to reduce the thermal stresses in the vertical pipes 59 produced by the hot water passing through them. As the vertical pipes deform axially due to the increment of temperature at vent's mouth, as compared to that at the sea surface, the upper cap may deform upward reducing the stress on the pipes. 51 Stainless steel or other suitable material heat exchanger upper cap. Vertical pipes 59 are joined by welding to the upper cap. Thickness of the upper cap may be similar to 2 centimeters. Element 50 is shown in FIGS. 2A, 10, 11, 14 and 15.

Figure 7:
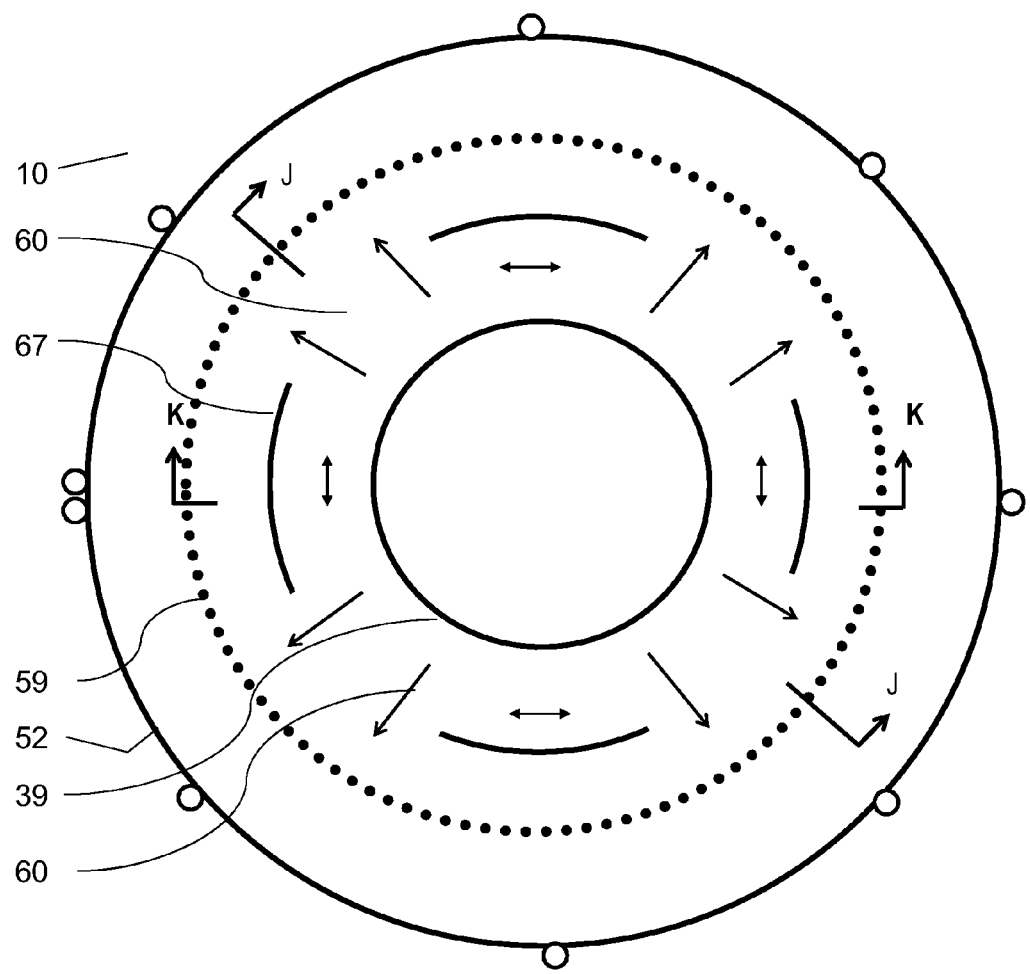
FIG. 7: Cross section E-E shown in FIG. 1. Drawing is not to scale. This figure shows in plan the outlet window to spill the descending water from the sea surface allowing this water to flow into the heat exchanger. There are four outlets whose dimensions depend on the descending water flow. The figure shows that the part of the external tube not occupied by the windows goes down to the bottom cap of the heat exchanger. Both the internal and the four continuous parts of the external concentric tubes are welded to the cap. In this way there is a continuous stress path from the bottom of the heat exchanger up to barge that finally is the support point of the whole apparatus. Perimeter small diameter pipes are also shown

52 Stainless steel or other suitable material wall of the heat exchanger. Wall thickness may be about 2 centimeters. Element 52 is shown in FIGS. 2A, 6 and 7.

53 Stainless steel or other suitable material heat exchanger lower cap. Vertical pipes 59 are joined by welding to the lower cap. The lower cap is welded to the lower radial beams 57. Lower cap thickness may be similar to 2.5 centimeters. Element 53 is shown in FIGS. 2A, 12 and 13.

54 Reduced section in the upper inlet windows. Descending water flows through the reduced area. Element 54 is shown dotted in FIG. 5.

56 Channel cross section circular beams welded to the wall 52 of the heat exchanger. The purpose of those beams is twofold. First, they are a necessary wall reinforcement to absorb thermal stresses. Second, they are necessary to transfer a portion of the heat exchanger weight to the inner and outer concentric tubes. Element 56 is shown in FIGS. 2A, 5, 6, 9, 14 and 15.

57 Radial beams located in several planes to carry a part of the heat exchanger own weight to the enlarged diameter outer and inner tubes. There are four radial beams in each plane. Five or more planes may be required depending on the heat exchanger dimensions and weight. The radial beams are welded to the wall 37 of the outer enlarged tube, the other extreme is free. A plate 79 distributes the stress contact in the tube's wall. The radial beams receive part of the heat exchanger weight transferred by the circular channel beams 56 welded to the wall 52. The beams facing the lower cap 53 are welded to it. Depending on the heat exchanger dimensions other reinforcements may be required. Element 57 is shown in FIGS. 2A, 6, 9 and 14.

Figure 16:
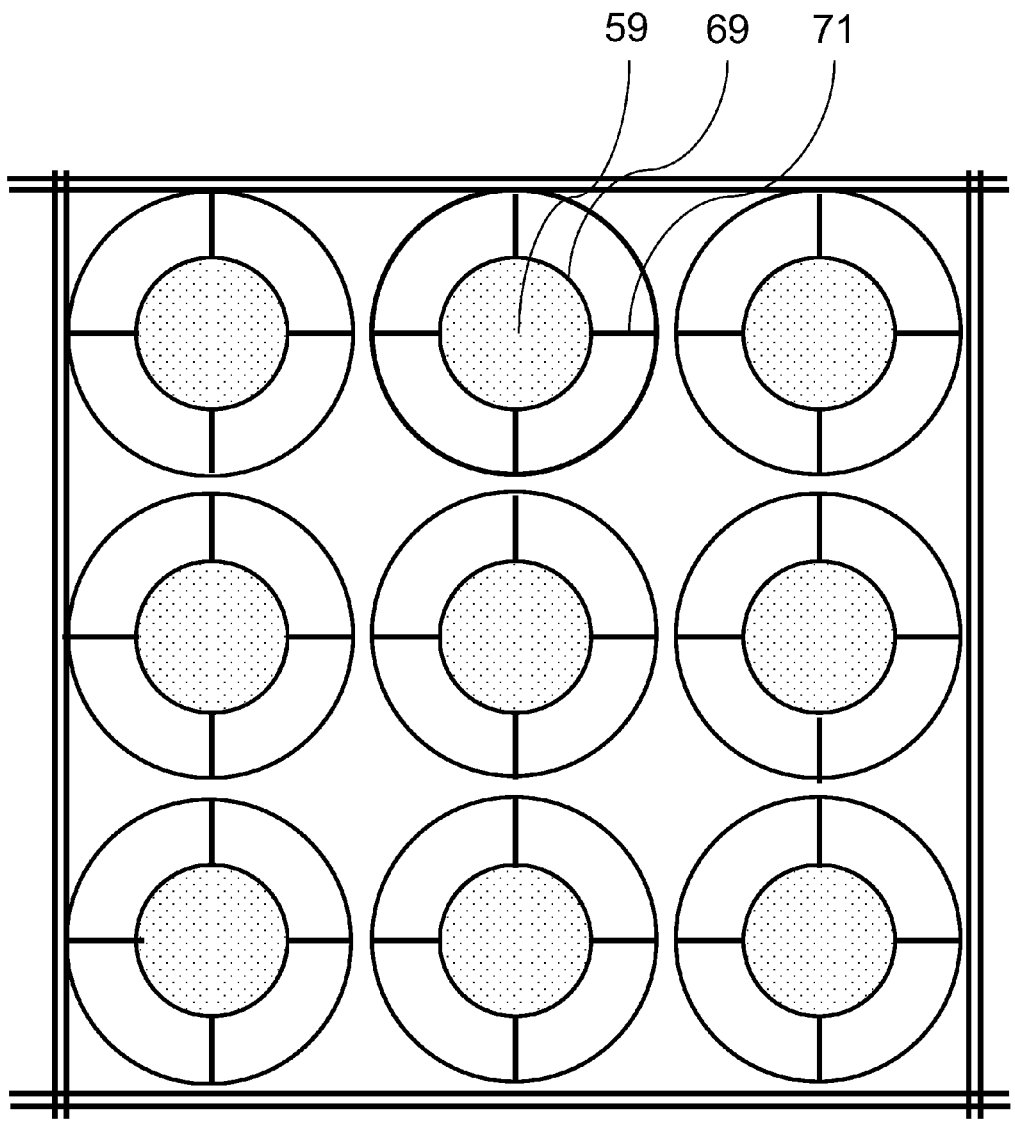
FIG. 16: Cross section N-N shown in FIG. 8. Drawing is not to scale. The figure shows the lateral supports of the vertical pipes. The rings of those supports are very close to each other. If there is a lateral bending of the vertical pipes one will push the other, forming a lateral support that may be important in the case of thermal stresses or in the rare case of horizontal vibrations of those vertical piles. The number of planes with those rings depends mainly on the height of the heat exchanger. The supports against the heat exchanger wall and against the enlarged diameter are not shown, but are similar to those shown in FIG. 16

59 Vertical high resistance special alloy pipes, through which slowly flows the vent's hot water; upward flow is shown dotted in FIG. 16. Those pipes may have an internal diameter similar to 3.7 centimeters with wall thickness of about 0.9 centimeters. Lateral deflections of those vertical pipes are limited by means of stainless steel rings 69 connected to the pipe by horizontal stainless steel elements 71. Those pipes must have a very high thermal conductivity and made of a low corrosion material. Element 59 is shown in FIGS. 2A, 6, 8, 10, 13, 14, 15 and 16.

60 Descending cool water spilling horizontally to the heat exchanger. Element 60 is shown in FIG. 12.

Figure 8:
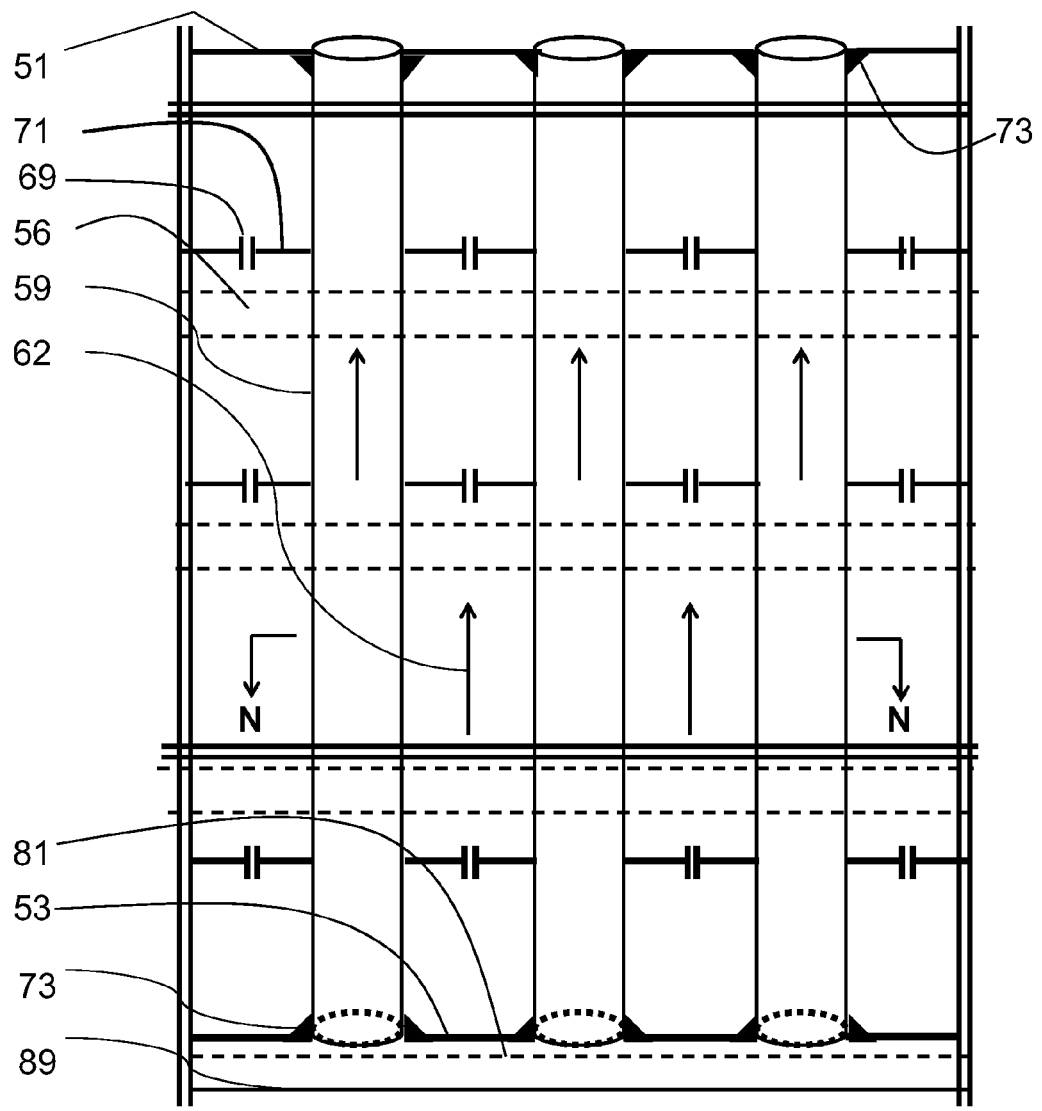
FIG. 8: Cross section F-F shown in FIG. 2. Drawing is not to scale. This figure shows the low corrosion, high resistant and high thermal conductivity vertical pipes arranged in circular positions inside the heat exchanger. The number of pipes required depends on the descending sea surface water flow. Internal diameter may be about 3.8 millimeters and wall thickness may be about 9 millimeters. Vertical tube extremes are open and welded to the lower and upper caps. The hot water passes into the pipes through the lower part and returns to the open sea through the upper open extreme of the pipes. The vent's flow never mixes with the descending sea surface water spilling through the outlet, whose initial horizontal motion changes to a vertical direction inside the heat exchanger where it is heated by thermal energy liberated by the walls of the vertical pipes.

62 Slowly ascending spilled water inside the heat exchanger through the free space between the vertical pipes 59. This water is heated by the thermal energy transferred by the vertical pipes 59 and by lower cap 53 and the wall 52 of the heat exchanger. The heated spilled water ascends to the upper part of the apparatus to pass into the double wall internal tube through the inlet windows 25. This flow is possible due to the over pressure induced by the combined action of the main pump 5 and the special valve 7. Element 62 is shown in FIGS. 2A, 5 and 8.

63 Heated water passing through the inlet windows to an inner fluid channel inside the heat exchanger then to the transitions section. This pressurized heated water flows up to the surface through the double wall inner tube.

67 Closed part of the lower portion of the enlarged diameter outer tube to increase the spilling speed of the descending water from sea surface. Element 67 is shown in FIG. 7.

69 Stainless steel or other suitable material separators rings located at several horizontal planes in the vertical pipes 59 to avoid or reduce the lateral bending of individual pipes due to thermal stresses or any other cause. The rings are kept in its place by mean of stainless steel connectors 71 welded to the pipes. Element 69 is shown in FIGS. 8 and 16.

71 Connectors to hold in place the rings 69. Element 71 is shown in FIGS. 8 and 16.

73 Welding of pipes 59 to upper and lower caps of the heat exchanger. Element 73 is shown in FIG. 8.

Figure 9:
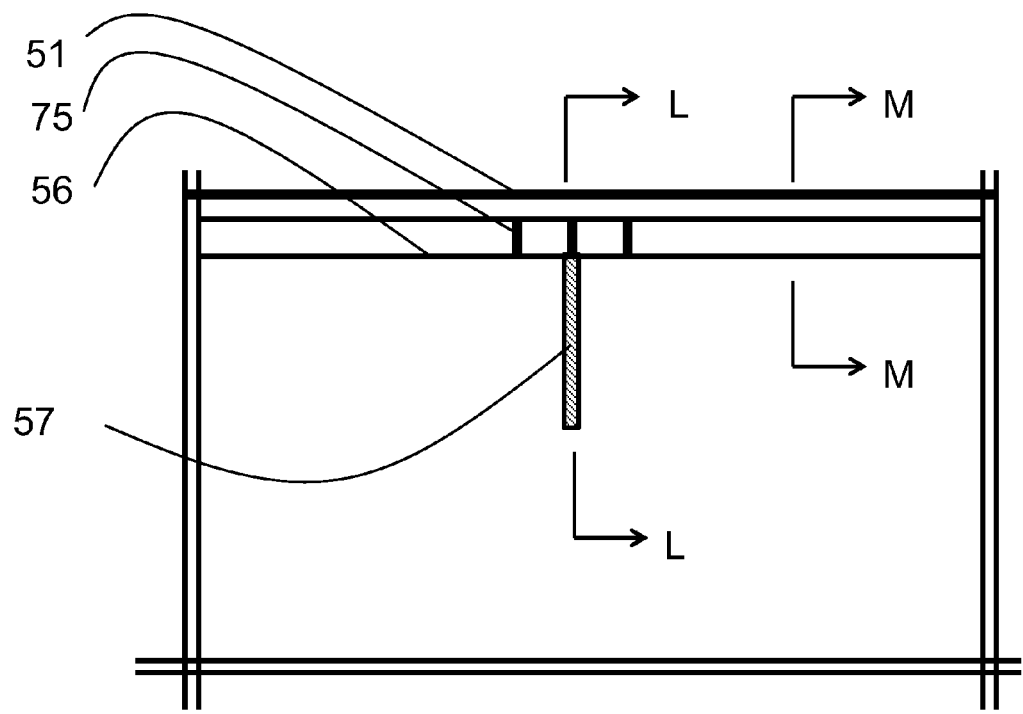
FIG. 9: Cross section G-G shown in FIG. 2. Drawing is not to scale. This figure shows the channel cross section circular beam welded to the wall of the heat exchanger. There are several beams like this one. The circular beams transfer part of the weight of the heat exchanger to the radial beams that transfer the load to the outer enlarged diameter tube. To avoid undesirable mechanical behavior of the circular beam in the support points, stiffeners are added.

75 Reinforcing small plates, stiffeners, to avoid the buckling of beam 75 at the contact points with beam 57. Element 75 is shown in FIG. 9.

79 Reinforcing plate to improve the welded support of radial beams 57. Element 79 is shown in FIG. 5.

81 Screen to avoid the income of undesirable objects to the vertical tubes 59. Element 81 is shown in FIG. 8.

83 Reinforcing plate to improve the welding of the exterior wall 37 of the outer tube to the lower cap of the heat exchanger. Element 83 is shown in FIG. 13.

85 Upper open extreme of vertical pipes 59. Element 85 is shown in FIGS. 10 and 11.

89 Lower flap to guide the vent's flow. Element 89 is shown in FIGS. 2A, 8, 12 and 13.

Figure 17:
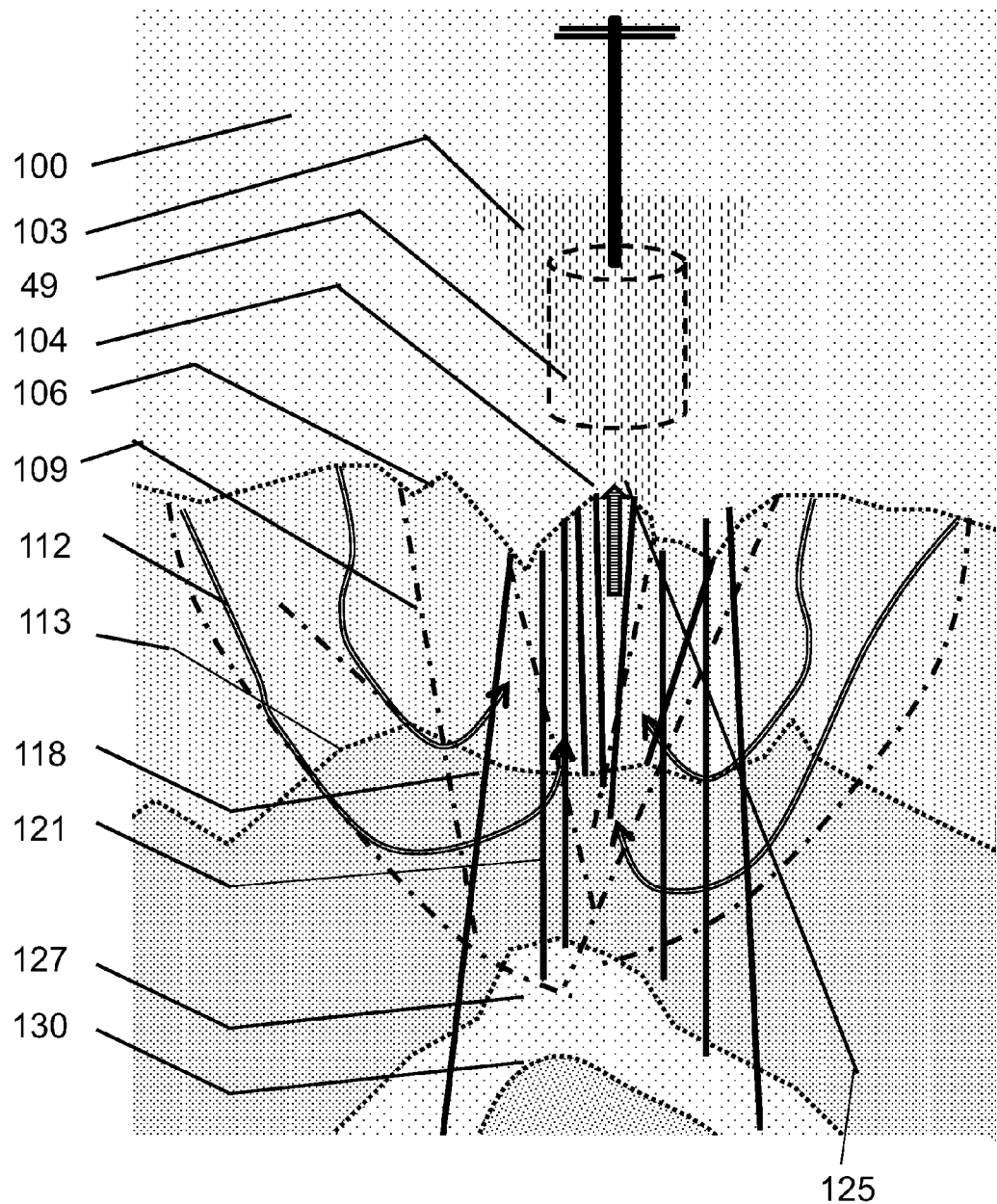
FIG. 17: Drawing is not to scale. This figure shows a general sketch of the deep sea floor in a ridge spreading zone. Faults, fissures and the natural porosity allow the cold sea water to penetrate down to very hot magmatic zones. The water is heated and a change of density forces it upward forming thermal vents or minor escapes through fissures or larger fractures. In the figure are indicated several wells to inject high pressure water to enhance the natural fracturing to obtain larger flows in the vents or eventually to stimulate the formation of new vents. Well's depth may be up to something like five hundred meters, or more, as the upper crust temperature permit. Depending on local conditions it would be required to stimulate a larger flowing through old vents or to form new ones; the combined wells, vertical, inclined and directional, would allow that. This is a unique characteristic that is a part of the patent application.

100 Sea in the vents zone with depth that may be up to about 3000 meters or even more. Element 100 is shown in FIG. 17.

103 Vent's hot water upward flow. The water temperature may be as high as 450° C. or even more in some vents. In other vents it may be as low as 20° C. It is possible that many vents are still unknown. There are vents in the spreading ridge of the oceans; some of them are more or less near to coastal zones. Element 103 is shown in FIG. 17.

104 Vent's mouth. Element 104 is shown in FIG. 17.

106 Floor of the oceanic upper crust in the spreading ridge zones. The crust is full of fractures and faults through which the cold seawater penetrates down zones whose temperature may be very high. Element 106 is shown in FIG. 17.

109 Active faults that allow the sea water to penetrate deep into the crust. Element 109 is shown in FIG. 17.

112 Seawater flow lines that penetrates down into hot zones of the oceanic crust. The water heats and due to density changes and steam pressure return to surface to flow through the vent's mouth and through fractures. Element 112 is shown in FIG. 17.

113 Hypothetical limit of hotter zones of the lower oceanic crust. Element 113 is shown in FIG. 17.

118 Inclined or directional wells drilled to inject high pressure water to stimulate the fracturing of the oceanic upper crust. Although it is possible that the water injection may close some fractures it will open paths to the ocean water to look for hotter zones of the oceanic crust. The possibility to enhance the hot water flow in existing vents or the production of new vents is a task that has not been tried at the present time; it can become a very important future possibility if combined with the apparatus of this patent application. Vertical wells are concentrated around the existing vent to catch additional hot water to augment the natural flow of the vent. Element 118 is shown in FIG. 17.

121 Vertical wells drilled near the existing vents or near potential zones for the creation of new vents or to improve those already existing. It is expected that several vertical wells are required for the stimulation process. Element 121 is shown in FIG. 17.

125 Hot acid water upward flow in the vent. This flow will be guided by the flap 89 to improve the fluid entrance to the vertical pipes 59. Element 125 is shown in FIG. 17.

127 Medium temperature of the magma ascending to the spreading ridge. Element 127 is shown in FIG. 17.

130 Very hot magma ascending from the mantle. Element 130 is shown in FIG. 17.

Some Aspects Related to the Construction Process and Apparatus Characteristics

The patent application procedure to mine the deep sea thermal energy released by the ridge spreading zones, along many of the oceans cordilleras, may be moved from site to site. Once the initial site becomes undesirable, the barge with the concentric tubes and the heat exchanger can be translated to a new place.

Besides of the barge GPS facilities to establish the precise position for the heat exchanger, it is expected that the GPS coordinates can be communicated to the heat exchanger, provided with small motors to maintain the position indicated by the GPS. This necessity arises because the slenderness of the concentric tubes may develop horizontal deflections of such magnitude for the heat exchanger to offset the vent's mouth. If this happens an important portion or all thermal energy may miss the heat exchanger. A special pipe for power and signals is provided along the outer tube for those requirements.

The heat exchanger shall be provided with TV cameras giving complementary information on the vent's surroundings to the procedure's operator controller located on the barge. Instruments will give information on vent's temperature and about other physical and chemical characteristics. Those controls are necessary because the heat exchanger doesn't touch the sea bed to avoid possible local environmental effects on the local fauna and flora or the topographic characteristics of the site. The bottom of the heat exchanger must be very close to the vent's mouth.

The construction process requires a large barge with an adequate and powerful crane. Once in vertical position, the outer tubes must be welded to be covered with a thick low mass density material to produce a flotation that reduces the power and loading capacity of the crane. Inner tubes segments are screwed once in vertical position.

It is almost certain that the whole heat exchanger must be constructed on land to be shipped. The vertical pipes positions on the heat exchanger must be exactly defined because no deformation except those of the thermal stresses and parts own weight should occur during construction. Also, it is expected that the heat exchanger construction be carried on more or less warm environment. The construction of the heat exchanger will include the enlarged diameter transition tubes. Once ready, the heat exchanger must be shipped to the ocean selected position, above a vent that has been selected after a careful analysis.

Once the heat exchanger is on site, the first segment of outer and inner constant diameters tubes is welded to the tubes transition. This first part of the assemblage is lowered into the sea. After that, new segments of the constant diameter tubes, welded the outer and screwed the inner, will be added till the completion of the whole apparatus.

The whole apparatus has three main general components: the elements on the barge, the outer and inner tubes that may go up to 3000 meters depth, or even more, and finally the heat exchanger.

The drilling of wells in the sea upper crust to improve the vent's flow is something that will depend on site conditions.

The general apparatus will produce clean base power that must be carried by high voltage DC submarine cables to the consumption localities.

The special heat exchanger (HE) is a large dimension cylinder with upper and lower caps. Heat exchanger external dimensions depend on the local vent conditions, but something similar to a diameter of five or more meters and height of ten or more meters, is expected to be obtained in final designs.

The enlarged constant diameter concentric tubes go from the upper to the lower caps of the HE. Those tubes are welded to the transition and to the caps. The transition is required to fit the enlarged diameter to the constant diameter of the long concentric tubes that extend from the HE to the sea surface Inside the HE there are hundreds of vertical pipes made of high resistance, low corrosion and high thermal conductivity pipes with an internal diameter similar to one and a half inch (3.7 centimeters). Vertical pipes are welded to the upper and lower caps. Both extremes of the pipes are open to allow the hot ascending water of the thermal vent to pass through the pipes.

The HE is different than most used in industrial applications because the heat flows in through many points (the vertical pipes) and through its wall and lower cap.

The descending sea surface water arrives at the HE by the enlarged diameter concentric tubes transition. The transition is connected to enlarged constant special concentric tubes that extend from top to bottom caps inside the HE. The surface seawater flowing through the concentric tubes in the HE descends down to the bottom cap and spills laterally. Once spilled this water heats while flowing up slowly and finally is forced to pass through the inlet window located beneath the upper cap.

While the spilled water ascends it absorbs the vent's heat transferred by the walls of the vertical pipes through which is flowing the vent's hot water. There is also heat transfer to the spilled water through the HE wall surface and through the bottom and upper caps surface. In a proper design, most of the heat transferred to the spilled water comes from the vertical pipes walls.

At the inlet located in the upper part of the enlarged diameter tubes of the HE, the cross section available for the descending water must be reduced to give room to the inlet windows, whose height and width depend on the magnitude of the sea surface water descending to the HE. There are preferably four inlet windows.

There are preferably four outlet windows located at the HE bottom. The complete perimeter of the inner concentric tube is welded to a reinforcement plate, which is also welded to the bottom cap. The outer tube has the four openings corresponding to the outlet windows. This arrangement allows the descending water to be spilled laterally with a speed adequate to stimulate some turbulence in the lower part of the HE spilled ascending water to improve the heat transferred from the vertical pipes.

The upper cap has two wide circular wrinkles to allow the steel plate to deform vertically due to the axial force developed by the heated vertical pipes. This important arrangement reduces the thermal stresses produced on the vertical pipes due to temperature increase when the vent's liquid flows through the pipes.

The HE has some special reinforcements to transfer its large weigh to the concentric tubes and those take that load to the barge. The lower cap is thicker than the upper one, due to mayor proportion of the load imposed by an important portion of the vertical tubes weight.

Differences between the present invention and the apparatus of U.S. application Ser. No. 12/718,546, filed Mar. 5, 2010 (Alberto Sarria) are that there is no drilling work for the concentric tubes. Accordingly:

First: There is not a braking and positioning sub system because the inner tube total weight is smaller due to a shorter length and due to the flotation forces developed by the vacuum between its inner walls and to the low density thick cover of the outer tube.

Second: The outer tube is wrapped with a thick cover of light mass density to produce a flotation force that due to its reduced weight, reducing the hoist load on the crane and easing the welding of those tubes once in vertical position in the barge Third: To join to the heat exchanger it is required an enlargement diameters transition for the concentric tubes. This is required to obtain the appropriate descending and ascending water flow velocities inside the heat exchanger and to permit the large outlet and inlet openings that allow it to function Fourth: Once inside the heat exchanger the concentric tubes have particularities due to the necessity to spill the descending water into its lower part and to allow the spilled water that slowly ascending along the HE, to pass to the enlarged diameter transition inner tube to take the heated water to surface due to the induced pressure of the combined action of the main pump and the special valve, both on the barge.

The invention claimed is:

1. A method for heating fluids using earth's internal energy released by thermal vents at sea floor ridge expansion zones, comprising:
   passing filtered and pressurized fluid from a barge into a concentric tube assembly having constant-diameter inner and outer tubes that form inner and outer fluid channels down to a heat exchanger suspended near the mouth of a thermal vent in the sea floor,
   passing the pressurized fluid through a transition section at the lower end of the constant diameter tube assembly that transitions to a larger diameter, passing the pressurized fluid from said transition section to an outer fluid channel, spilling the pressurized fluid into the heat exchanger through outlet windows in a lower part of said outer fluid channel inside the heat exchanger, passing the spilled fluid through spaces between vertical pipes in the heat exchanger, for heating the fluid by thermal energy transferred from said vertical pipes through which flow hot water released from the thermal vent, passing the heated fluid through inlet windows to an inner fluid channel, ascending the heated fluid toward the sea surface through the inner fluid channel of the concentric tube assembly, where the heated fluid may be used to generate power, controlling pressures of the ascending and descending fluid by combined action of a pump and a valve located on the barge, preventing bending of the concentric tube assembly, and controlling amplitude of horizontal vibrations of the inner tube, with supports and separators attached to an external wall of the constant diameter inner tube, said inner tube being of double walled construction with a space between said double walls.

2. The method of claim 1, where the ascending fluid pressure is controlled by a combination of said pump which is located where the fluid enters the outer fluid channel and a valve which is located where the fluid arrives at the surface.

3. The method of claim 1, wherein said fluid is sea surface water.

4. The method of claim 1, wherein the mouth of vent is at least 50 meters depth.

5. The method of claim 1, wherein the heat exchanger is at least 3,000 meters depth.

6. The method of claim 1, wherein seawater desalination is an integral process with power generation.

7. The method of claim 1, wherein rock in the oceanic crust has been fractured by high pressure water injected through vertical, inclined or directional wells, thereby enhancing the rate of hot water expelled from the mouth of the vent.

8. The method of claim 1, wherein a thick low mass density material is on the constant diameter outer tube to generate a flotation force.

9. The method of claim 1 where external pipes are welded to the constant diameter outer tube and to the heat exchanger wall for high pressure water flushing of the heat exchanger bottom cap, and for signals cables and power cable of instruments and motors located on the heat exchanger.

10. The method of claim 1, wherein the heat exchanger is a stainless steel (or other corrosion resistant) cylinder having a wall and an upper cap and a lower cap welded to the wall, a lower flap to guide and concentrate the vent's flow on the lower cap of the heat exchanger, vertical pipes from lower to upper caps arranged in concentric circular positions around a vertical axis of the heat exchanger, vertical pipes open at both extremes to allow the fluid expelled by the vent to flow through.

11. The method of claim 1, wherein the heat exchanger has concentric enlarged diameter one wall tubes along the vertical axis that extend between the upper and lower caps forming an outer channel in most of its length and inner channel in the upper part of the tubes, welded connections between the enlarged diameter transition above the heat exchanger and the enlarged constant diameter of outer and inner one wall tube inside the heat exchanger a descending water outlet is formed by rectangular windows in the lower part of the outer constant diameter tube whose dimensions depend on the magnitude of the cold descending fluid from sea surface, an ascending water inlet is formed by rectangular windows in the upper part of the inner and outer constant diameter tubes whose dimensions depend on the magnitude of the cold descending fluid from sea surface, vertical low corrosion and high thermal conductivity alloy pipes whose open extremes are welded to the lower and upper caps of the heat exchanger.

12. The method of claim 1, wherein the heat exchanger has separators between vertical pipes to avoid bending which are formed by rings and horizontal supports located at various horizontal planes, circular reinforcing beams are welded to the internal face of the heat exchanger wall located at various horizontal planes that depend on the heat exchanger dimensions, supporting radial beams are welded to the outer enlarged diameter that form the supports for the circular reinforcing beams, a grid below the lower cap to retain coarse material expelled by the vent's mouth, external shielded and corrosion resistant pipe welded to the heat exchanger wall to protect the cables signals of the TV cameras, the power cable for the electric motors of the heat exchanger and the cables for the external instrumentation of the heat exchanger, high strength corrosion resistant external pipes for the lower cap flushing, and an optional thermal insulating internal cover in the upper part of the cylinder wall.

13. Apparatus for heating fluids using earth's internal energy released by thermal vents at sea floor ridge expansion zones, comprising:

a pump for passing filtered and pressurized fluid produced on a barge;

said pump further comprises a filter, a concentric tube assembly having constant-diameter inner and outer tubes that form inner and outer fluid channels, said constant-diameter inner tube further comprises an internal and an external wall, a space formed between said internal and said external wall; said constant-diameter inner tube is capable of carrying the fluid to the barge; said constant-diameter outer tube is capable of carrying the fluid from the barge;

a plurality of separators attached to said external wall of the constant diameter inner tube;

a plurality of supports connect the external wall of the constant-diameter inner tube to the internal wall of the constant-diameter inner tube;

a valve connected to said concentric tube assembly, said valve located on the barge;

a transitional section at the lower end of the concentric tube assembly that transitions to a larger diameter; said transitional section comprises a transitional inner fluid channel that is capable of communicating with said constant diameter inner tube; and a transitional outer fluid channel that is capable of communicating with said constant diameter outer tube;

a heat exchanger suspendable near a mouth of a thermal vent in the sea floor; said heat exchanger comprises an external wall, a top and a bottom;

said heat exchanger top defines an upper cap welded to said heat exchanger external wall; said heat exchanger bottom defines a lower cap welded to said heat exchanger external wall;

an inner fluid channel communicating with said transitional inner fluid channel; an outer fluid channel communicating with said transitional outer fluid channel;
a plurality of outlet windows located in a lower part of said outer fluid channel of said heat exchanger;
a plurality of inlet windows located in an upper part of said heat exchanger;
a plurality of vertical pipes connecting said bottom to said top of said heat exchanger, said vertical pipes have open ends for passing of sea water through said heat exchanger.

14. The apparatus of claim 13, wherein said constant-diameter inner tube is capable of carrying fluid from the heat exchanger to said valve, which fluid has a pressure; said pump and said valve are capable of controlling said pressure.

15. The apparatus of claim 13, wherein said fluid is sea surface water.

16. The apparatus of claim 13, wherein said mouth of said vent is at least 50 meters depth.

17. The apparatus of claim 13, wherein said heat exchanger is at least 3,000 meters depth.

18. The apparatus of claim 13, wherein: the fluid carried to the barge is used to generate power; fluid carried to the barge is desalinated, and seawater desalination is an integral process with power generation.

19. The apparatus of claim 13, wherein rock in the oceanic crust has been fractured by high pressure water injected through vertical, inclined or directional wells, thereby enhancing the rate of hot water expelled from the mouth of said vent.

20. The apparatus of claim 13, wherein a thick low mass density material is on said constant-diameter outer tube to generate a flotation force.

21. The apparatus of claim 13, wherein said vent's mouth depth is at least 3000 meters.

22. The apparatus of claim 13, wherein:
said heat exchanger is a stainless steel (or other corrosion resistant) cylinder; said heat exchanger further comprises a lower flap to guide and concentrate said vent's flow on said lower cap of said heat exchanger;
said vertical pipes are arranged in concentric circular positions around a vertical axis of said heat exchanger.

23. The apparatus of claim 13, wherein:
said vertical pipes are made of low corrosion and high thermal conductivity alloy.

24. The apparatus of claim 13, wherein:
said heat exchanger has separators between said vertical pipes to avoid bending; said separators are formed by rings and horizontal supports located at various horizontal planes; said heat exchanger further comprises:
circular reinforcing beams welded to the internal face of said heat exchanger wall; said circular reinforcing beams are located at various horizontal planes that depend on said heat exchanger dimensions;
said outer fluid channel comprises a wall; supporting radial beams welded to said wall of said outer fluid channel said radial beams form supports for said circular reinforcing beams;
a screen-below said bottom cap to retain coarse material contained in the incoming sea water generated by said vent's mouth;
an optional thermal insulating internal cover in the upper part of said external wall of said heat exchanger.

\* \* \* \* \*